United States Patent
Feng

(10) Patent No.: US 12,176,008 B2
(45) Date of Patent: Dec. 24, 2024

(54) METHOD AND APPARATUS FOR MATCHING MUSIC WITH VIDEO, COMPUTER DEVICE, AND STORAGE MEDIUM

(71) Applicant: Tencent Technology (Shenzhen) Company Limited, Shenzhen (CN)

(72) Inventor: Xin Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 4 days.

(21) Appl. No.: 18/200,444

(22) Filed: May 22, 2023

(65) Prior Publication Data

US 2023/0290382 A1  Sep. 14, 2023

Related U.S. Application Data

(63) Continuation of application No. PCT/CN2022/111318, filed on Aug. 10, 2022.

(30) Foreign Application Priority Data

Sep. 17, 2021 (CN) .......................... 202111089950.2

(51) Int. Cl.
  *G11B 27/06* (2006.01)
  *G10H 1/36* (2006.01)
(52) U.S. Cl.
  CPC ............. *G11B 27/06* (2013.01); *G10H 1/368* (2013.01); *G10H 2240/141* (2013.01)
(58) Field of Classification Search
  CPC ... G11B 27/06; G10H 1/368; G10H 2240/141
  See application file for complete search history.

(56) References Cited

U.S. PATENT DOCUMENTS 10,090,020 B1 * 10/2018 Bentley .............. G11B 27/3081
2009/0157203 A1   6/2009 Bregar et al.
(Continued)

FOREIGN PATENT DOCUMENTS

CN   110677711 A   1/2020
CN   111741233 A   10/2020
(Continued)

OTHER PUBLICATIONS

Tencent Technology, WO, PCT/CN2022/111318, Sep. 29, 2022, 2 pgs.

(Continued)

*Primary Examiner* — Thai Q Tran
*Assistant Examiner* — Jose M Mesa
(74) *Attorney, Agent, or Firm* — Morgan, Lewis & Bockius LLP

(57) ABSTRACT

This application relates to a method for matching music with a video performed by a computer device, and a storage medium. The method includes: determining a cut speed of a video; determining a long-time audio speed corresponding to each of a plurality of pieces of candidate music according to a high-scale point and a music duration of the candidate music; selecting matched music from the pieces of candidate music according to the cut speed and the corresponding long-time audio speeds; determining, according to a video duration of the video and a high-scale point corresponding to the matched music, a short-time audio speed corresponding to each music clip in the matched music; and determining a target music clip in the matched music according to the cut speed of the video and the corresponding short-time audio speed, and synthesizing the target music clip and the video to obtain a target video.

20 Claims, 12 Drawing Sheets

(56) References Cited

U.S. PATENT DOCUMENTS

| | | | |
|---|---|---|---|
| 2010/0040349 A1* | 2/2010 | Landy | G11B 27/005 |
| | | | 386/239 |
| 2012/0308209 A1* | 12/2012 | Zaletel | G11B 27/34 |
| | | | 386/E5.028 |
| 2015/0139615 A1* | 5/2015 | Hill | H04N 21/2743 |
| | | | 386/285 |
| 2015/0160916 A1 | 6/2015 | Lothan | |
| 2021/0195284 A1 | 6/2021 | Song | |

FOREIGN PATENT DOCUMENTS

| | | |
|---|---|---|
| CN | 113365147 A | 9/2021 |
| CN | 112231499 A | 10/2021 |
| CN | 113542626 A | 10/2021 |

OTHER PUBLICATIONS

Tencent Technology, IPRP, PCT/CN2022/111318, Mar. 5, 2024, 5 pgs.

Tencent Technology, ISR, PCT/CN2022/111318, Sep. 29, 2022, 2 pgs.

* cited by examiner

METHOD AND APPARATUS FOR MATCHING MUSIC WITH VIDEO, COMPUTER DEVICE, AND STORAGE MEDIUM

CROSS-REFERENCE TO RELATED APPLICATIONS

This application is a continuation application of PCT Patent Application No. PCT/CN2022/111318, entitled "METHOD AND APPARATUS FOR MATCHING MUSIC WITH VIDEO, COMPUTER DEVICE, AND STORAGE MEDIUM" filed on Aug. 10, 2022, which claims priority to Chinese Patent Application No. 202111089950.2, entitled "METHOD AND APPARATUS FOR MATCHING MUSIC WITH VIDEO, COMPUTER DEVICE, AND STORAGE MEDIUM" filed with the Chinese Patent Office on Sep. 17, 2021, all of which is incorporated by reference in its entirety.

FIELD OF THE TECHNOLOGY

This application relates to the field of computer technologies, and in particular, to a method and apparatus for matching music with a video, a computer device, and a storage medium.

BACKGROUND OF THE DISCLOSURE

With the development of the Internet, people have become accustomed to sharing their own videos through the Internet. A short video having a cool effect in which an audio rhythm matches a video clip rhythm becomes the most popular video form currently. When the picture and music in a short video are effectively combined, users watching the video can feel the atmosphere in the video, and have an immersive feeling.

At present, the matching degree between a music speed and an edited short video is subjectively sensed mainly by human ears by listening to the song, and music is selected according to the subjectively sensed matching degree, so as to obtain matched music. After the matched music is selected, an approximate sequence to be selected in the matched music is confirmed by repeatedly listening to the song, and the approximate sequence to be selected and the edited short video are synthesized to obtain a final video. However, a music clip used for matching is selected by people, which may result in low efficiency of matching music with a video.

SUMMARY

Embodiments of this application provide a method and apparatus for matching music with a video, a computer device, a storage medium, and a computer program product.

A method for matching music with a video is performed by a computer device, the method including:
 determining a cut speed of a video for which music is to be matched;
 determining a long-time audio speed corresponding to each of a plurality of pieces of candidate music according to a high-scale point and a music duration of the candidate music;
 selecting matched music from the plurality of pieces of candidate music according to the cut speed of the video and the corresponding long-time audio speeds;
 determining, according to a video duration of the video and a high-scale point corresponding to the matched music, a short-time audio speed respectively corresponding to each music clip in the matched music; and
 determining a target music clip in the matched music according to the cut speed of the video and the corresponding short-time audio speed, and synthesizing the target music clip and the video to obtain a target video.

A computer device, includes a memory and one or more processors, the memory storing computer-readable instructions, and the computer-readable instructions, when executed by the one or more processors, causing the computer device to perform the aforementioned method for matching music with a video.

A non-transitory computer readable storage medium, stores a computer program, the computer program, when executed by one or more processors of a computer device, causes the computer device to perform the aforementioned method for matching music with a video.

DESCRIPTION OF EMBODIMENTS

Figure 1:
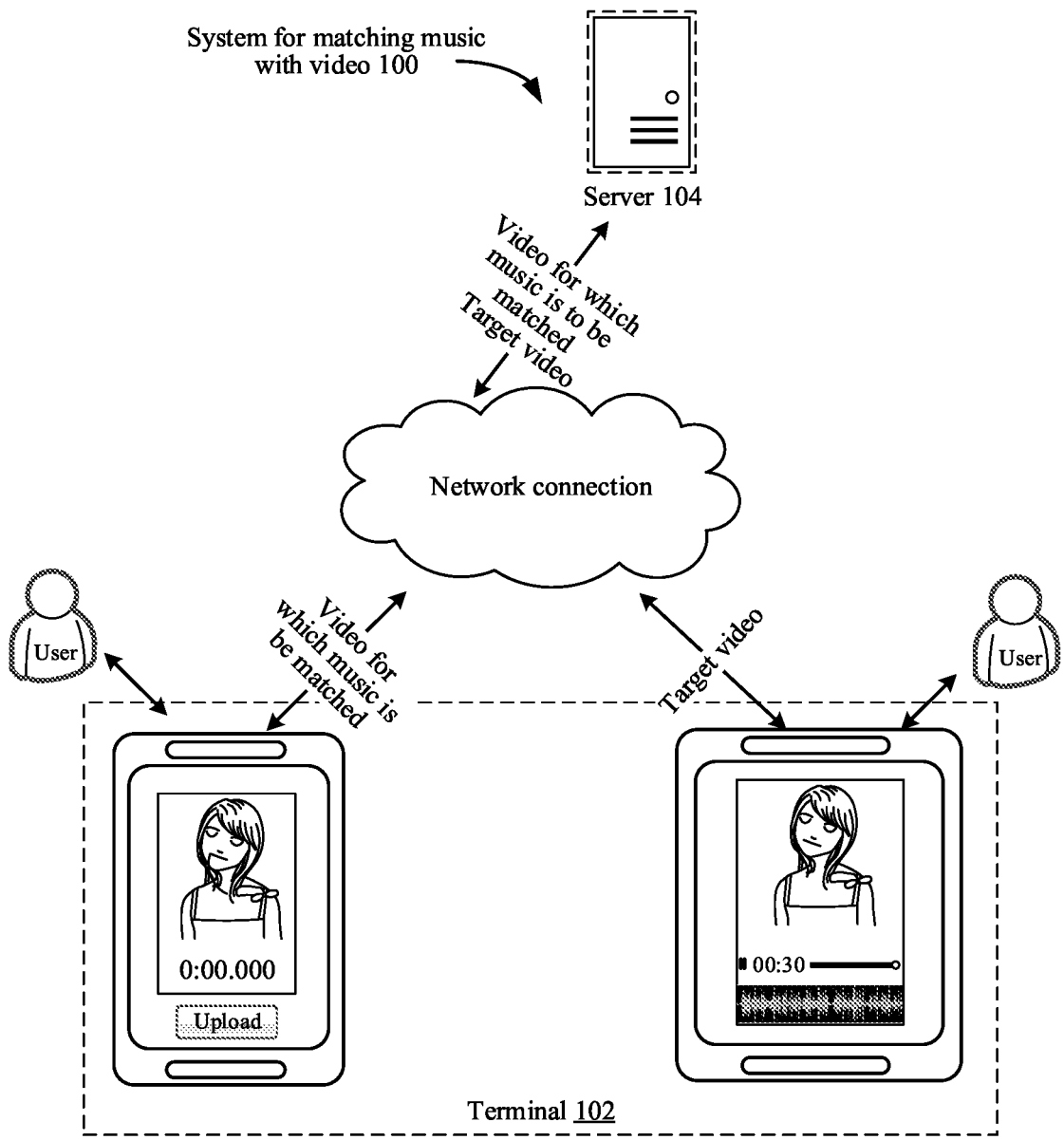
FIG. 1 is a diagram of an application environment of a method for matching music with a video according to an embodiment.

FIG. 1 is a diagram of an application environment of a method for matching music with a video according to an embodiment. Referring to FIG. 1, the method for matching music with a video is applied to a system for matching music with a video 100. The system for matching music with a video 100 includes a terminal 102 and a server 104. The terminal 102 and the server 104 may be separately configured to perform the method for matching music with a video provided in the embodiments of this application, and the terminal 102 and the server 104 may also work in conjunction to perform the method for matching music with a video provided in the embodiments of this application. Description is made by taking an example in which the terminal 102 and the server 104 work in conjunction to perform the method for matching music with a video provided in the embodiments of this application. The terminal 102 runs a video editing application for video editing, and a user may edit a short video through the video editing application to obtain a video for which music is to be matched. The terminal 102 sends said video to the server 104, so that the server 104 selects matched music from a music library according to a cut speed of said video and a long-time audio speed of each piece of candidate music in the music library, and selects a target music clip from music clips according to a short-time audio speed of each music clip in the matched music and the cut speed of said video. The server 104 synthesizes the target music clip and said video to obtain a target video, and returns the video for which music has been matched to the terminal 102, so that the terminal 102 plays the video for which music has been matched.

The server 104 may be an independent physical server, or may be a server cluster composed of a plurality of physical servers or a distributed system, or may be a cloud server that provides a cloud computing service. The terminal 102 may be a smart phone, a tablet computer, a notebook computer, a desktop computer, a smart loudspeaker, a smart watch, a vehicle-mounted terminal, a smart television, etc., but is not limited thereto. The terminal 102 may be provided with a client, and the client may be a video editing client, a client for matching music with a video, or the like. The quantity of the terminal 102 and the server 104 is not limited in this application. The terminal 102 and the server 104 may be directly or indirectly connected in a wired or wireless communication manner, which is not limited in this application.

Figure 2:
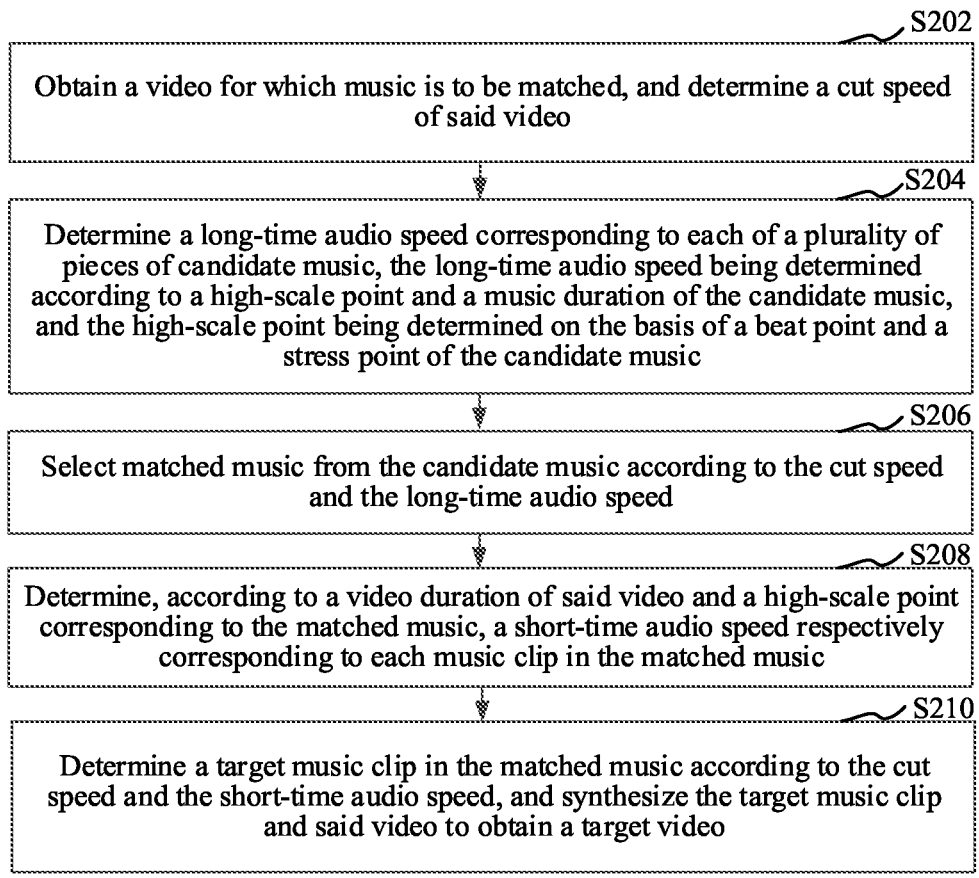
FIG. 2 is a schematic flowchart of a method for matching music with a video according to an embodiment.

In an embodiment, as shown in FIG. 2, provided is a method for matching music with a video. Description is made by taking an example in which the method is applied to a computer device. The computer device may be specifically the terminal or server in FIG. 1. The method for matching music with a video includes the following steps:

S202: Obtain a video for which music is to be matched, and determine a cut speed of said video.

The video for which music is to be matched refers to a video which includes a video picture but does not include music. The video may be a video edited by a user through a video editing application, or may be a video collected by a user through a video collection application. Since said video has a certain video duration, said video may include at least one shot. The shots refer to decomposed shots of a video shot (or clip). When a video needs to be captured or edited, the user may cut, according to factors such as shot size, camera movement, dialogue, and shot length, the content of the entire video into a plurality of shots to be captured or edited. The shots to be captured or edited are called as shots.

Specifically, When music needs to be matched with the video, the computer device may obtain said video, determine the number of shots included in said video, and obtain a cut speed of said video according to a video duration of said video and the number of shots. For example, the computer device may divide the video duration by the number of shots to obtain the cut speed.

In an embodiment, a video editing application is run in the terminal, and the user may use the video editing application clip to obtain said video through editing. Further, the terminal may further obtain a music library. The music library includes a plurality of pieces of candidate music, and the candidate music may be selected by the user from the music library according to requirements, or may be pre-stored by the computer device. This is not limited in this embodiment.

In an embodiment, when the music library needs to be obtained, the computer device may obtain music supported by the video editing application, and take the music supported by the video editing application as candidate music in the music library. It is easy to understand that the music supported by the video editing application may change with the change of the music copyright, and therefore, the candidate music in the music library may also be correspondingly changed.

In an embodiment, the user may obtain a to-be-edited material, determine the number of shots and a video material respectively corresponding to each shot, and then edit a to-be-edited video through the video editing application to obtain said video. The to-be-edited material may be a video or a picture. When the to-be-edited material is a picture, the user can determine the number of pictures needing to be edited and a display duration of each picture, so that the user can edit the plurality of pictures through the video editing application and according to the determined number of the pictures and the determined display duration to obtain said video. The total number of pictures displayed in said video is the number of shots of said video.

In an embodiment, the video editing application running in the terminal may include a control for matching music with a video. When the user obtains, by means of editing, said video and wants to match music with said video, the user may touch the control for matching music with a video, so that the terminal may, in response to the touch operation of the user, obtain the music library and determine the cut speed of said video.

In an embodiment, when the computer device obtains said video, the computer device may identify video frames in said video to obtain transition video frames, take the number of the transition video frames as the number of shots of said video, and divide a video duration of said video by the number of the shots to obtain the cut speed. The transition video frame refers to a video frame of transition or switching between scenes, i.e., a video frame for connecting two different scenes.

S204: Determine a long-time audio speed corresponding to each of a plurality of pieces of candidate music. The long-time audio speed is determined according to a high-scale point and a music duration of the candidate music. The high-scale point is determined on the basis of basic points of the candidate music, and the basic points include a beat point and a stress point. The long-time audio speed reflects a frequency at which the high-scale point appears in the candidate music.

The basic points include the stress point and the beat point. The stress point may also be referred to as an onset point, which refers to a time point at which a rhythmic drumbeat in an audio is located, for example, the stress point may be a time point at which a drumbeat appears in a section of audio, or a time point at which a stress percussion sound occurs in a section of audio. In an embodiment, the stress point may be specifically a time point at which a peak point in an audio signal sequence is located. The audio signal sequence refers to a curve in a target coordinate system taking a time as a horizontal coordinate and a sound amplitude as a vertical coordinate. For a section of audio, the audio may be sampled at a preset sampling frequency to obtain a plurality of discrete audio sampling points, and the plurality of audio sampling points are placed in the target coordinate system to obtain an audio signal sequence composed of discrete audio sampling points.

Beat is a basic unit of an audio over time, which refers to a combination rule of strong and weak beats, and may be specifically the total length of notes of each measure. When a song has strong and weak beats cyclically repeated according to a certain time sequence, a combination of the strong and weak beats is a beat. For example, when a song has 4/4 time signature, then a quarter note counts as one beat in the song, and when four beats are included in each measure, a strong-weak beat combination rule of the four beats in each measure is strong, weak, semi-strong, and weak. Correspondingly, the strong-weak beat combination rule of a song having three beats in each measure is strong, weak, and weak. The beat point refers to a point where a beat in the audio signal sequence is located, and may be specifically an audio sampling point corresponding to a starting beat in the beats. For example, when a duration from 1:20 to 1:22 in a song is a measure, the time 1:22 is the beat point, The long-time audio speed refers to an audio speed corresponding to the whole piece of music, and the speed may be determined by the high-scale points included in the whole piece of music and a music duration of the music, which reflects a frequency at which the high-scale point appears in the whole piece of music. The high-scale point may be determined by the basic points in the music. The music duration refers to a playing duration of the music, for example, when a duration of a song is 3 minutes, the music duration of the song is 3 minutes.

Specifically, when the music library is obtained, for each piece of candidate music in the music library, the computer device determines high-scale points respectively included in each piece of candidate music, determines a music duration of each piece of candidate music, and obtains a long-time audio speed of the corresponding candidate music according to the number of high-scale points and the music duration of the candidate music. For example, the computer device determines the number of the high-scale points included in the current candidate music and the music duration of the current candidate music, and divides the number of the high-scale points of the current candidate music by the music duration of the current candidate music to obtain the long-time audio speed of the current candidate music.

In an embodiment, the high-scale point and the long-time audio speed may be determined before step S202. That is, before music is matched with said video, the high-scale point and the long-time audio speed respectively corresponding to each piece of candidate music in the music library may be pre-calculated, so that, subsequently, music may be matched with said video only by directly obtaining the high-scale point and the long-time audio speed of the corresponding candidate music. It is easy to understand that the high-scale point and the long-time audio speed may also be determined after step S202, which is not limited in this embodiment.

In an embodiment, the audio signal sequence is composed of discrete audio sampling points, and the audio signal sequence has phase and amplitude characteristics, which respectively determine the trend and amplitude of the whole audio track. When the amplitude of the audio sampling point in the audio signal sequence reaches the maximum value, a time point corresponding to the audio sampling point is a stress point, which means that the audio at this time point is a heavy rhythmic drumbeat.

In an embodiment, the determining a long-time audio speed corresponding to each of a plurality of pieces of candidate music includes: for each piece of candidate music in a music library, determining a beat point and a stress point in the candidate music, and determining a high-scale point in the corresponding candidate music according to the beat point and the stress point; and determining a long-time audio speed of the corresponding candidate music according the music duration and the high-scale point of the candidate music.

Specifically, a piece of lively music includes a large number of basic points, that is, including a large number of beat points and stress points, and thus, the density of the basic points is relatively high, so that the accuracy of matched music determined on the basis of the basic points is not high. Therefore, in order to improve the accuracy of selected matched music, the matched music can be selected from the music library through the high-scale point.

For each piece of candidate music in the music library, the computer device determines the basic points in the candidate music, so as to determine stress points and beat points included in each piece of candidate music, and select the stress points or the beat points according to a time interval between the stress points and the beat points to obtain a screened stress point or beat point. Further, the computer device takes the selected stress point or beat point as a high-scale point. The computer device counts the number of the high-scale points included in each piece of candidate music and a music duration of each piece of candidate music, and divides the number of the high-scale points by the corresponding music duration to obtain the long-time audio speed of the candidate music. In order to better understand this embodiment, the process of determining the long-time audio speed of one piece of candidate music in the music library is further described below. For the current candidate music in the music library, the computer device determines basic points included in the current candidate music, selects on the basic points to obtain a selected basic point, and takes the selected basic point as a high-scale point. Further, the computer device determines the music duration of the current candidate music, and determines the long-time audio speed of the current candidate music according to the number of the high-scale points included in the current candidate music and the music duration of the current candidate music.

In an embodiment, the computer device may select the stress points or the beat points according to an appearance time interval between the stress points and the beat points in the music. For example, for a piece of music, whether a stress point and a beat point appear within a preset time period is determined, and when the stress point and the beat point appear, the stress point or the beat point appearing within the preset time period is taken as the high-scale point. When only the stress point or only the beat point appears within the preset time period, the computer stops taking the stress point or beat point appearing within the preset time period as the high-scale point.

In an embodiment, the computer device may determine the long-time audio speed of the candidate music through the formula $S_{all}=N_{all}/T$. $N_{all}$ is the number of the high-scale points included in the candidate music, and T is the music duration of the candidate music.

In an embodiment, the for each piece of candidate music in a music library, determining a basic point in the candidate music, and determining a high-scale point in the corresponding candidate music according to the basic point includes: for each piece of candidate music in a music library, determining a beat point and a stress point respectively corresponding to each piece of candidate music, and determining, according to the beat point and the stress point respectively corresponding to each piece of candidate music, a high-scale point respectively corresponding to each piece of candidate music. The determining a long-time audio speed of the corresponding candidate music according to the music duration and the high-scale point of the candidate music includes: determining, according the music duration and the high-scale point respectively corresponding to each piece of candidate music, a long-time audio speed respectively corresponding to each piece of candidate music.

In the foregoing embodiment, by selecting, from the basic points, a high-scale point that better reflects the music rhythm, matched music determined on the basis of the high-scale point may be more accurate.

In an embodiment, the determining a high-scale point in the corresponding candidate music according to the beat point and the stress point includes: taking one of a stress point and a beat point existing within a preset time interval in the candidate music as the high-scale point.

Specifically, since the candidate music may include a plurality of stress points and a plurality of beat points, for each of the plurality of stress points, the computer device determines whether the respective stress points have corresponding beat points within a preset time interval. When the stress point has the corresponding beat point, one of the stress point or the beat point corresponding to the stress point is taken as the high-scale point.

In order to better understand this embodiment, the process of determining a beat point corresponding to a stress point is further described below. For the current stress point in the plurality of stress points, the computer device takes the current stress point as the center of a preset time interval, determines whether a beat point exists within the preset time interval, and if yes, takes the beat point as a beat point corresponding to the current stress point. For example, in the current candidate music, when the preset time interval is agreed to be 4 seconds and a stress appears at 1:20, that is, the current stress point is 1:20, the computer device may take 1:20 as the center of the time interval, determine whether a beat point exists within a time period from 1:18 to 1:20, and determine whether a beat point exists within a time period from 1:20 to 1:22. When a beat point exists within the time period from 1:18 to 1:20, or a beat point exists within the time period from 1:20 to 1:22, the beat point is taken as a beat point corresponding to the current stress point. Further, the computer device takes one of the current stress point or the beat point corresponding to the current stress point as the high-scale point. In this way, the high-scale point selected on the basis of the stress point and the beat point may reflect both a stress feature and a beat feature.

In an embodiment, for each stress point in the candidate music, a time window corresponding to the stress point is determined according to the preset time interval and an occurrence time of the stress point in the candidate music; whether a beat point exists within the time window is determined; the time window corresponds to the preset time interval; and When a beat point exists within the time window, the beat point and the stress point that exist within the time window are taken as the stress point and beat point having a corresponding relationship, and one of the stress point and beat point having a corresponding relationship are taken as the high-scale point.

In an embodiment, When the stress point and the beat point simultaneously appear within the preset time interval, the computer device may further count the number of stress points and the number of beat points appearing within the preset time interval. When a plurality of stress points or a plurality of beat points occur, only one of the plurality of stress points may be taken as a high-scale point, or only one of the plurality of beat points may be taken as a high-scale point.

In an embodiment, for a plurality of stress nodes and beat nodes having a corresponding relationship in the current candidate music, the stress nodes may be uniformly taken as a high-scale point, the beat nodes may also be uniformly taken as high-scale nodes, and one of the stress node and the beat node may also be randomly taken as a high-scale node. This is not limited in this embodiment.

In the foregoing embodiment, since the high-scale point is obtained by selecting the stress points or beat points within the preset time period, the high-scale point may reflect both the stress feature and the beat feature. Compared with the matched music that is selected only through the stress feature or the beat feature, the embodiment of this application obtains the high-scale point by integrating the stress feature and the beat feature, so that the matched music determined on the basis of the high-scale point may be more accurate.

S206: Select matched music from the candidate music according to the cut speed and the long-time audio speed.

Specifically, in order to select matched music satisfying the rhythm-synchronized requirement of said video, the long-time audio speed of each piece of candidate music may be matched with the cut speed to obtain matched music. For example, when the cut speed of said video is one shot per 4 seconds, the computer device may take candidate music of which the long-time audio speed is one high-scale point per 4 seconds as matched music, or take candidate music of which the long-time audio speed is the multiple cut speed as matched music, for example, taking candidate music having a target long-time audio speed as matched music. The target long-time audio speed is a multiple of the cut speed. For example, the target long-time audio speed is ½ times of the cut speed, that is, when the cut speed is one shot per 4 seconds, candidate music in which one high-scale point appears per 2 seconds is taken as matched music. In this way, when shot switching is performed on a target video generated on the basis of the matched music, that is, when scene switching is performed, a stress or a strong or weak beat may occur.

S208: Determine, according to a video duration of said video and a high-scale point corresponding to the matched music, a short-time audio speed respectively corresponding to each music clip in the matched music. The short-time audio speed reflects a frequency at which a high-scale point appears in a music clip, and the short-time audio speed is determined according to a clip duration of the music clip and the number of high-scale points included in the music clip.

Specifically, since a duration of a piece of complete song may be longer than a video duration of said video, a target music clip needs to be intercepted from matched music, and the target music clip is taken as the music of said video. For example, when a music duration of matched music is 3 minutes and a video duration of said video is 30 seconds, the computer device may intercept a music clip of 30 seconds from the matched music, and synthesize the intercepted music clip and said video to obtain a target video including an audio.

When a target music clip needs to be intercepted from the matched music, the computer device may determine a video duration of said video, and intercept the matched music according to the video duration, so that a clip duration of each intercepted music clip is consistent with the video duration. Further, for each of the plurality of music clips, the computer device determines the number of high-scale points included in the current music clip, and divides the number of high-scale points included in the current music clip by the clip duration of the current music clip to obtain a short-time audio speed of the current music clip. That is, the number of the high-scale points of the current music clip is divided by the video duration of said video to obtain a short-time audio speed of the current music clip. The short-time audio speed is an audio speed corresponding to the music clip, and the short-time audio speed reflects a frequency at which the high-scale point appears in the music clip. In an embodiment, the computer device may determine the short-time audio speed of the music clip through the formula $S_{local}=N_{local}/T_{video}$. $N_{local}$ is the number of the high-scale points included in the music clip, and $T_{video}$ is the clip duration of the music clip.

S210: Determine a target music clip in the matched music according to the cut speed and the short-time audio speed, and synthesize the target music clip and said video to obtain a target video.

Specifically, when the short-time audio speed of each music clip in the matched music is obtained, the computer device may match the short-time audio speed respectively corresponding to each music clip and the cut speed of said video to obtain a matching result. Further, the computer device determines, according to the matching result, a music clip having the highest matching value among the plurality of music clips, takes the music clip having the highest matching value as a target music clip matching said video, and synthesizes the target music clip and said video to obtain a target video. In an embodiment, the computer device performs alignment processing on the target music clip and said video, so as to synthesize the target music clip and said video, so that the video and the music may be played at the same time.

In the related art, the stress point density and the beat point density may be estimated by means of the total number of stress points or beat points in an audio and a duration of the audio, then an audio speed of the audio is estimated according to the stress point density or the beat point density, and a piece of appropriate music is selected from the music library according to the audio speed. However, for a piece of lively music, the number of stress points or beat points included in the music may be more than that of quiet music, and correspondingly, the stress point density or beat point density may be higher than one point per second. However, dense stress points or beat points actually cannot well represent the rhythm of the music, so that the music selected from the music library through the high-density beat points or stress points cannot actually satisfy the rhythm-synchronized requirements of the shots of said video. In the embodiments of this application, the beat points and the stress points in the music are selected to obtain the high-scale points with the low density, so that the music determined on the basis of the high-scale points can better satisfy the rhythm-synchronized requirements of the shots of said video, and can also be closer to the music rhythm required by said video, thereby greatly improving user experience.

In the method for matching music with a video, a cut speed of said video may be determined by obtaining said video. By obtaining the music library, the long-time audio speed and the high-scale point respectively corresponding to each piece of candidate music in the music library may be determined, so that matched music may be preferentially selected from the music library on the basis of the long-time audio speed and the cut speed. By determining the matched music, the short-time audio speed of each music clip in the matched music may be determined on the basis of the high-scale point and the video duration of said video, so that the most matched target music clip is selected from the plurality of music clips on the basis of the short-time audio speed and the cut speed. In this way, the target video synthesized on the basis of the most matched target music clip can be closer to the music rhythm, so that a scene transition time point in the target video is more matched with an occurrence time point of a stress or beat, thereby greatly improving the viewing experience. Music can be automatically matched with said video by the computer device, and therefore, compared with conventional manual matching, this application can also improve the matching efficiency of matching music with a video.

In an embodiment, the determining a cut speed of said video includes: determining a video duration of said video and the number of shots included in said video; and determining the cut speed of said video according to the video duration and the number of shots.

Specifically, when the cut speed of said video needs to be determined, the computer device may determine a video duration of said video, determine the number of shots included in said video, and obtain the cut speed of said video according to the number of shots and the video duration. For example, the computer device may divide the number of shot by the video duration to obtain the cut speed.

In an embodiment, when music needs to be matched said video, a user may input the number of shots included in said video, so that the computer device determines the corresponding cut speed on the basis of the number of shots inputted by the user.

In an embodiment, the computer may determine, according to a scene change condition in said video, the number of shots included in said video. For example, each time one scene is switched, the computer device enables the number of shots to be incremented by 1. The computer device may use an image identification algorithm to identify an element included in each video frame in said video. When the difference between elements included in two adjacent video frames is greater than a preset difference threshold, the computer device determines that the two adjacent video frames are video frames in different scenes respectively, so that the computer device may determine that the latter video frame is subjected to scene switching compared with the former video frame. In this case, the computer device enables the number of the shots to be incremented by 1. For example, when elements included in two adjacent video frames are different, the computer device enables the number of current shots to be incremented by 1. The elements in the video frames include, but are not limited to, trees, houses, animals, humans, etc. By identifying the elements included in the video frames, the number of shots may be automatically obtained on the basis of the identification result. Compared with manually determining the number of shots, the efficiency of determining the number of shots is improved.

In the foregoing embodiment, by determining the number of shots and the video duration, the cut speed may be determined on the basis of the number of shots and the video duration, so that a matched target music clip may be determined subsequently on the basis of the cut speed.

In an embodiment, basic points include beat points and stress points. The for each piece of candidate music in a music library, determining a basic point in the candidate music includes (that is, the determining a beat point and a stress point in the candidate music includes): determining a feature energy curve corresponding the candidate music; performing peak detection on the feature energy curve to obtain a peak in the feature energy curve, and determining the stress point in the candidate music according to the peak; and determining an energy change rule in the feature energy curve, and determining a beat point in the candidate music according the energy change rule.

Specifically, for the candidate music, it is difficult to determine the signal characteristics in a time domain, and therefore, the candidate music can be converted from the time domain to energy distribution in the frequency domain, and the basic point is determined by observing the energy distribution of the candidate music. When the candidate music is obtained, the computer device may determine a feature energy curve corresponding to the candidate music, and perform peak and trough detection on the feature energy curve to determine a peak and a trough in the feature energy curve. The feature energy curve reflects a change condition of energy corresponding to each audio frame in the candidate music. It is easy to understand that the sound amplitude of the stress is greater than the sound amplitude of the light tone in music, and the greater the sound amplitude of the audio frame, the greater the energy contained in the audio frame, so that a sampling time point corresponding to the peak in the feature energy curve may be taken as a stress point. Further, the beat reflects a combination rule of strong beats and weak beats, and therefore, the computer device may determine an energy change rule in the feature energy curve, and determine a beat point in the candidate music according to the energy change rule.

In the foregoing embodiment, only by determining the feature energy curve of the candidate music, the basic point in the candidate music may be accurately determined on the basis of the feature energy curve, thereby improving the accuracy of the high-scale point determined on the basis of the basic point.

In an embodiment, the determining a feature energy curve corresponding the candidate music includes: framing the candidate music to obtain at least one audio frame; respectively performing Fourier transform on each audio frame to obtain a spectrogram respectively corresponding to each audio frame; splicing the plurality of spectrograms along a time domain to obtain a music spectrogram of the candidate music; and performing differential calculation on the music spectrogram to obtain a feature energy curve of the music spectrogram.

Figure 3:
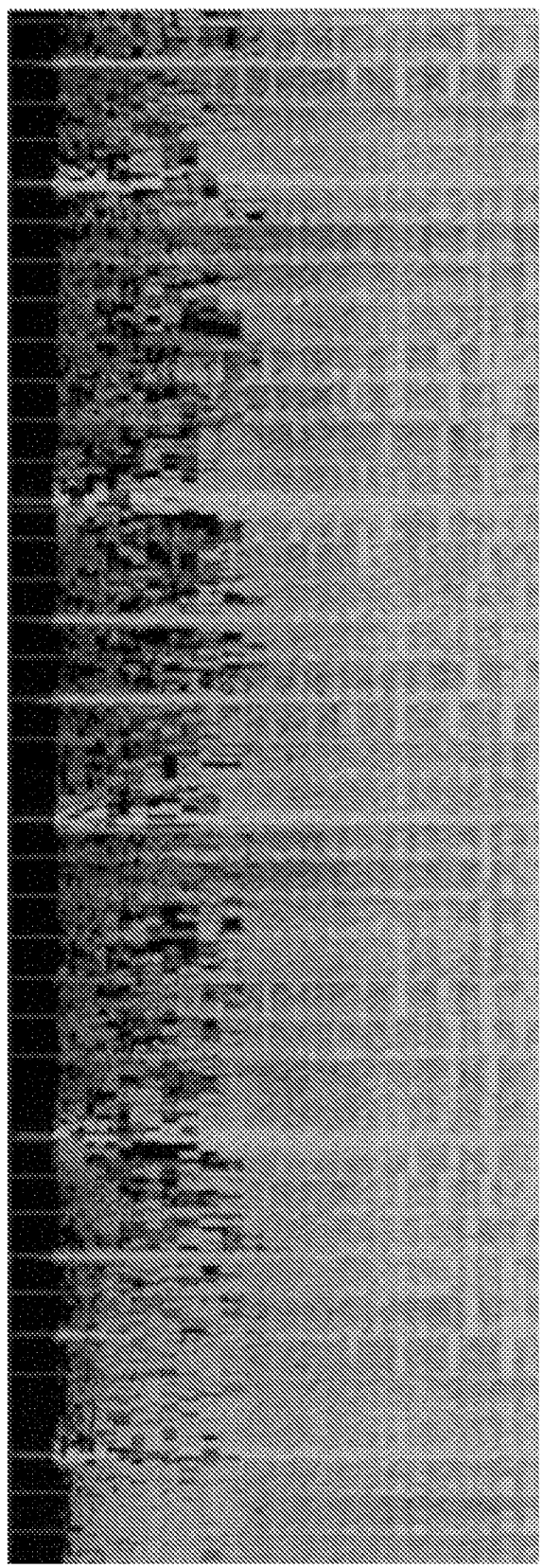
FIG. 3 is a schematic diagram of a music spectrogram according to an embodiment.

Specifically, the computer device frames the candidate music to obtain at least audio frame, and respectively performs Fourier transform on each audio frame to obtain a spectrogram respectively corresponding to each audio frame. Since the spectrogram can only describe the sound distribution condition of each frequency at a certain time point and cannot represent the sound distribution condition within a time period, the plurality of spectrograms need to be spliced along the time domain to obtain the corresponding music spectrogram. Further, the computer device performs differential calculation on the music spectrogram to obtain a spectrum flux respectively corresponding to each spectrogram, and connects each spectrum flux to obtain a feature energy curve. In an embodiment, FIG. 3 shows a schematic diagram of a music spectrogram according to an embodiment.

In an embodiment, a difference calculation formula $SF(K) = \Sigma_{i=0}^{n-1} S(k,i) - S(k-1, i)$ may be used to perform differential calculation on the music spectrogram. $SF(K)$ is the spectral value of the K-th spectrogram in the music spectrogram, $S(k,i)$ is the amplitude corresponding to the i-th frequency in the K-th spectrogram, and $\Sigma_{i=0}^{n-1} S(k,i) - S(k-1, i)$ is the amplitude corresponding to the i-th frequency in the (K−1)th spectrogram. That is, the amplitude of each frequency band of the previous spectrum is subtracted from the amplitude of the corresponding frequency band in the current spectrum, and the calculated difference is added to obtain the spectrum flux.

In an embodiment, in order to remove redundant data in the music spectrogram, the computer device may further use a Mel filter to filter the music spectrogram to obtain a Mel spectrum, and perform differential processing on the Mel spectrum to obtain a feature energy curve of the candidate music. The Mel filter may filter the redundant data in the music spectrogram to ensure effective data therein to obtain a corresponding Mel spectrum. The Mel filter can be set according to a human ear hearing model, so that the set Mel filter only pays attention to certain specific frequencies, and allows for passage of signals with the specific frequencies, and thus, the Mel spectrum filtered on the basis of the Mel filter can more represent auditory characteristics of the human ears.

Figure 4:
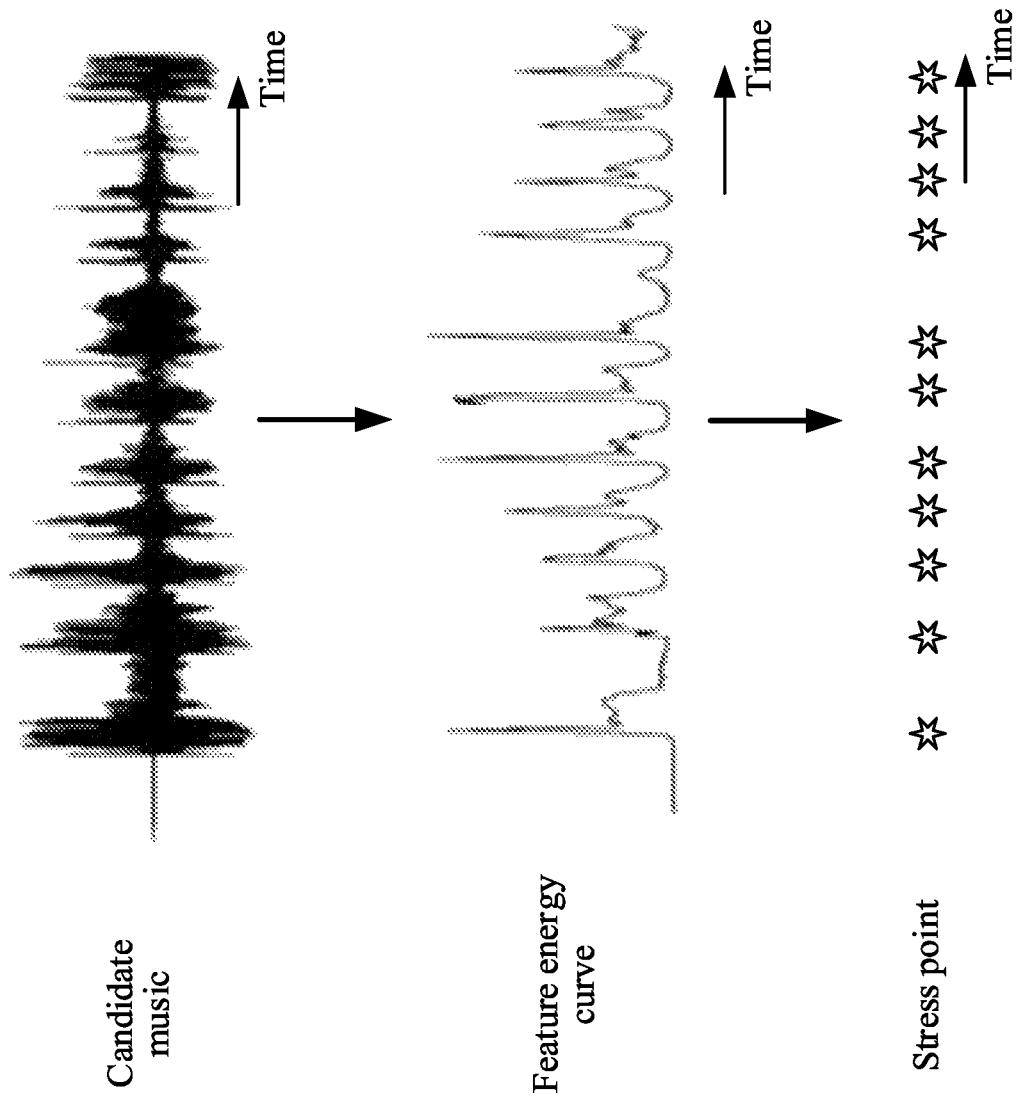
FIG. 4 is a schematic diagram of a stress point determining process according to an embodiment.

In an embodiment, FIG. 4 is a schematic diagram of a stress point determining process according to an embodiment. When the candidate music is obtained, the computer device may perform Fourier transform and Mel filtering processing on the candidate music to obtain a corresponding music spectrogram, and perform differential operation on the music spectrogram to obtain a corresponding feature energy curve. The computer device performs peak detection on the feature energy curve by means of a preset peak detection function to obtain a peak value in the feature energy curve, takes a target audio sampling point corresponding to the peak value as a sampling point collected when a stress occurs in the candidate music, records a target sampling time of the target audio sampling point, and takes the target sampling time as a stress point, so that the audio at the stress point is represented as a heavy rhythmic drumbeat.

In this embodiment, the feature energy curve of the candidate music may be obtained by performing Fourier transform and differential calculation on the candidate music, so as to subsequently detect the feature energy curve to obtain a corresponding basic point.

In an embodiment, the determining an energy change rule in the feature energy curve, and determining a beat point in the candidate music according the energy change rule includes: obtaining a first sliding window, and smoothing the feature energy curve through the first sliding window to obtain an energy change rule in the feature energy curve; and obtaining a beat point in the candidate music according the energy change rule.

Specifically, since the beat reflects the combination of strong and weak beats cyclically repeated according to a certain time sequence, and the feature energy corresponding to the strong beat is large and the feature energy corresponding to the weak beat is small, the energy change rule in the feature energy curve may be identified through the preset first sliding window, and the beat point in the candidate music is determined on the basis of the energy change rule.

In an embodiment, the smoothing the feature energy curve through the first sliding window to obtain an energy change rule in the feature energy curve includes: triggering the first sliding window to slide on the feature energy curve according to a first preset sliding step length to obtain a plurality of feature energy curve segments boxed by the first sliding window; for the plurality of feature energy curve segments boxed by the first sliding window, determining a change rule of peaks and troughs in each feature energy curve segment; when the change rules of the peaks and troughs in two adjacent feature energy curve segments are consistent, determining that the two adjacent feature energy curve segments respectively correspond to one beat; and selecting, from the candidate music, a music clip corresponding to a feature energy curve segment corresponding to one beat, and taking a collection time of the first audio sampling point in the music clip as a beat point.

The computer device determines the first sliding window used for identifying the energy change rule, and enables the first sliding window to slide on the feature energy curve to obtain feature energy curve segments boxed by the first sliding window. For the plurality of feature energy curve segments boxed by the first sliding window, the computer identifies peaks and troughs in each feature energy curve segment, and determines a change rule of the peaks and the troughs in each feature energy curve segment. When the change rules of the peaks and troughs in two adjacent feature energy curve segments are consistent, it can be determined that the two adjacent feature energy curve segments respectively correspond to one beat. For example, when the change rule of the peaks and troughs in two adjacent feature energy curve segments is both a peak, a trough, a peak, and a trough, and the peak value of the first peak is greater than the peak value of the second peak, it can be determined that the two adjacent feature energy curve segments respectively correspond to one beat. The window size of the first sliding window may be freely set according to requirements.

Further, when it is determined that the feature energy curve segment corresponds to one beat, the computer device determines a music clip corresponding to the feature energy curve segment, and takes a collection time of the first audio sampling point in the music clip as a beat point. When the music clip is converted from the time domain to the frequency domain to obtain a corresponding spectrogram, and differential calculation is performed on the spectrogram to obtain a feature energy curve segment, the music clip corresponds to the feature energy curve segment. The music clip refers to a music clip in the candidate music.

In an embodiment, since the feature energy curve is determined by the spectrum flux of each spectrogram, and each spectrogram corresponds to one audio frame, when it is determined that the feature energy curve fragment corresponds to one beat, a target spectrum flux forming the feature energy curve segment can be determined, and a target audio frame generating the target spectrum flux may be determined. The computer device determines a sampling time point of each target audio frame, takes the minimum sampling time point in the sampling time points as a target time point, and takes the target time point as a beat point.

Figure 5:
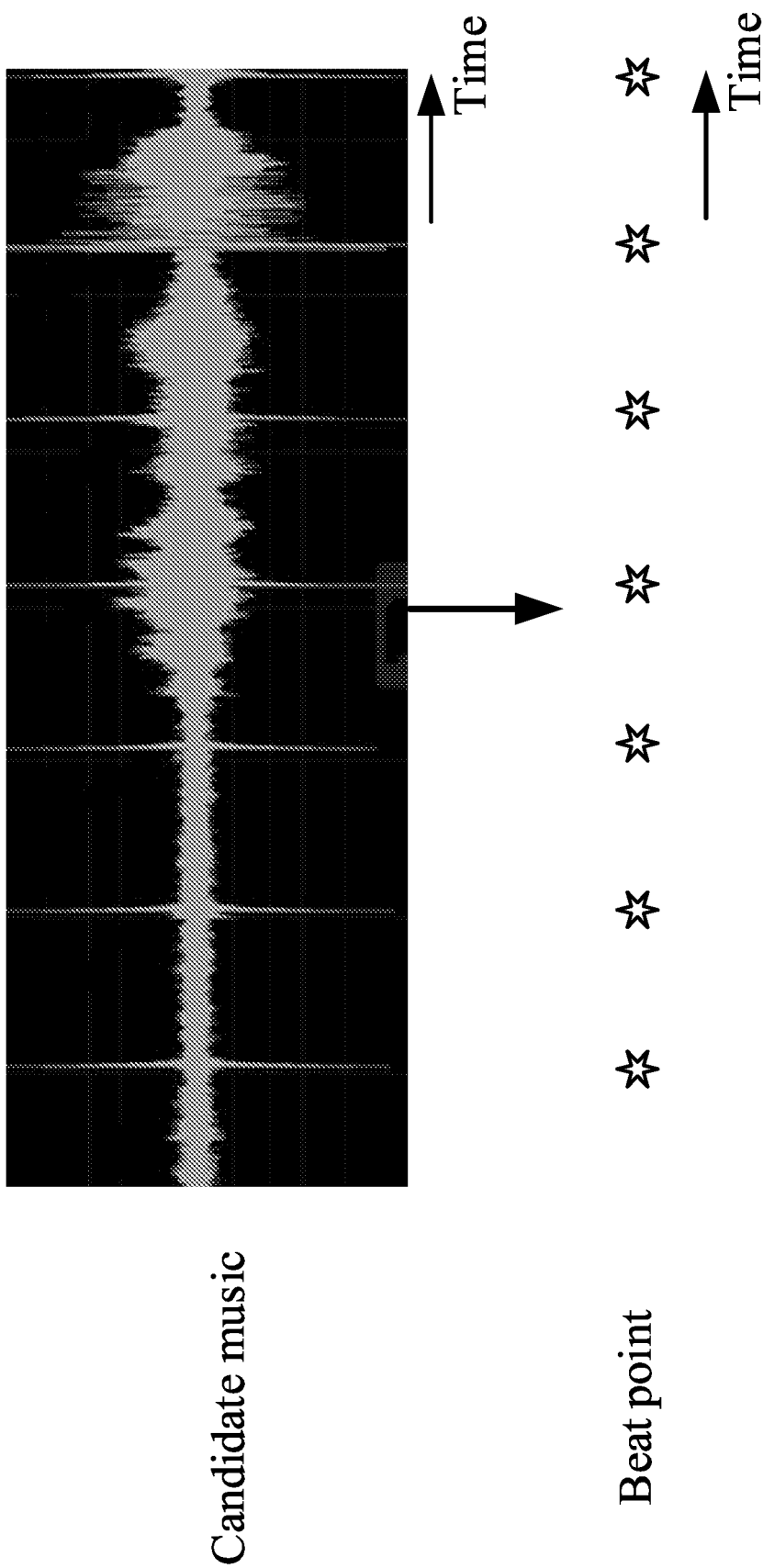
FIG. 5 is a schematic diagram of a beat point according to an embodiment.

In an embodiment, FIG. 5 is a schematic diagram of a beat point according to an embodiment. The computer device may determine a beat point in the audio signal sequence according to the energy change rule in the feature energy curve.

In the foregoing embodiment, since the beat reflects the combination of strong and weak beats cyclically repeated according to a certain time sequence, and the feature energy corresponding to the strong beat is large and the feature energy corresponding to the weak beat is small, the beat point may be accurately determined by the obtained energy change rule in the feature energy curve, and the accuracy of matching music with a video is further improved on the basis of the accurately determined beat point.

In an embodiment, the taking one of a stress point and a beat point existing within a preset time interval in the candidate music as the high-scale point includes: for each stress point in the candidate music, setting a time window by taking a current stress point as a center, and determining whether a beat point exists within the time window, where the time window corresponds to the preset time interval; and when a beat point exists within the time window, taking one of the beat point and the current stress point that exist within the time window as the high-scale point.

Specifically, when a stress point in the candidate music is determined, for each of the plurality of stress points, the computer device sets a time window by taking a current stress point as a center, and determines whether a beat point exists within the time window. A time length boxed by the time window is consistent with a time length corresponding to the preset time interval. When a beat point exists within the time window, it may be considered that the time difference between the beat point and the current stress point is less than a preset time threshold. In this case, the computer device takes the beat point and the current stress point that exist within the time window as the stress point and beat point having a corresponding relationship. The computer device may take one of the stress point and beat point having a corresponding relationship as the high-scale point. It is easy to understand that the computer device may simultaneously determine a time window respectively corresponding to each stress point, and simultaneously determine, through each time window, a plurality of stress points and beat points having a corresponding relationship. The computer device may also sequentially determine a time window respectively corresponding to each stress point, and sequentially determine, according to the sequentially determined time window, a stress point and a beat point having a corresponding relationship.

Figure 6:
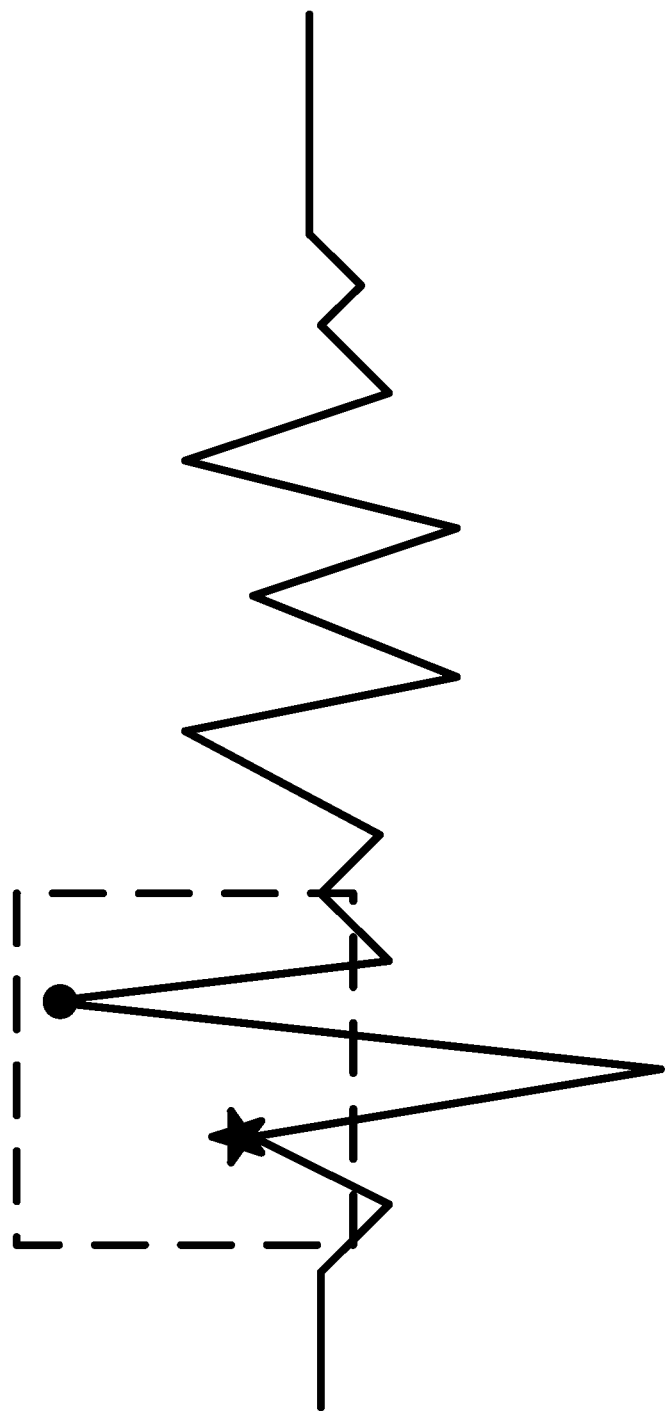
FIG. 6 is a schematic diagram of determining a corresponding relationship between a stress point and a beat point according to an embodiment.

In an embodiment, when the beat point and the stress point in the candidate music are determined, according to the occurrence time points of the beat point and the stress point, the beat point and the stress point may be tagged in an audio signal sequence corresponding to the candidate music. Further, for each of the plurality of stress points, the computer device sets a time window by taking a current stress point as a center in the audio signal sequence, and determines whether a beat point exists within the time window. When the beat point exists, the beat point and the current stress point are taken as a pair of points having a corresponding relationship. Referring to FIG. 6, when the audio signal sequence corresponding to the candidate music is shown in FIG. 6, the computer device may determine a current stress point in the audio signal sequence, and determine, according to the time window, a beat point corresponding to the current stress point. FIG. 6 is a schematic diagram of determining a corresponding relationship between a stress point and a beat point according to an embodiment.

In the foregoing embodiment, since the beat point corresponding to the current stress point may be determined only through the time window, the efficiency of determining a corresponding relationship between the points is improved, and the efficiency of matching music with a video is further improved. Since the stress point and the beat point having a corresponding relationship are both located within a same time window, the high-scale point selected on the basis of the stress point and the beat point having a corresponding relationship conforms to the auditory characteristics of the human ears, and can also be accurately positioned at the rhythm position, so that the matched music determined on the basis of the high-scale point may be more accurate.

In an embodiment, the selecting matched music from the candidate music according to the cut speed and the long-time audio speed includes: matching the long-time audio speed respectively corresponding to each piece of candidate music in a music library with the cut speed to obtain a first matching value respectively corresponding to each piece of candidate music; selecting at least one piece of target candidate music from the music library according the first matching value; and determining a music tag respectively corresponding to each piece of target candidate music, and selecting the matched music from the at least one target candidate music according to the music tag and the first matching value.

Specifically, when it is determined that the long-time audio speed of the candidate music and the cut speed of said video are obtained, the computer device matches the cut speed of said video with the long-time audio speed respectively corresponding to each piece of candidate music in the music library to obtain a first matching value between each piece of candidate music and said video. Further, the computer device may select a piece of target candidate music from the music library according the first matching value. For example, the computer device may the candidate music of which the first matching value is higher than a preset matching threshold as a piece of target candidate music. For another example, the computer device may sort the candidate music in a descending order according to the first matching value to obtain a candidate music sequence, extract a preset number of candidate music from the head of the candidate music sequence, and take the extracted candidate music as target candidate music.

Further, the computer device determines a music tag respectively corresponding to each piece of target candidate music, integrates the music tag and the first matching value, scores the corresponding target candidate music to obtain a music score respectively corresponding to each piece of target candidate music, and takes the target candidate music having the highest score as matched music. The music tag refers to information used for reflecting music features, and the music tag may specifically include a music popularity, a music publishing time, a music playing amount, etc.

In an embodiment, the computer device may determine the corresponding first matching value according to the difference between the cut speed and the long-time audio speed. The smaller the difference, the higher the matching degree between the cut speed and the long-time audio speed, and the higher the first matching value. For example, when the cut speed is one shot per 3 seconds, and the long-time audio speed of the current candidate music is a high-scale point per 3 seconds, it can be determined that the first matching value between the current candidate music and said video is 100%.

In an embodiment, the selecting the matched music from the at least one piece of target candidate music according to the music tag and the first matching value includes: obtaining a music tag respectively corresponding to each piece of target candidate music; the music tag at least including one of a music popularity, a music publishing time, and a music playing amount; for each of the plurality of pieces of target candidate music, scoring the corresponding target candidate music according to the music tag to obtain a tag score of the corresponding target candidate music; and fusing the tag score and the first matching value respectively corresponding to the target candidate music to obtain a music score of the corresponding target candidate music, and selecting the matched music according to the music score respectively corresponding to each piece of target candidate music.

For each of the plurality of pieces of target candidate music, the computer device may determine the music tag of the current target candidate music, and scores the corresponding target candidate music on the basis of the music tag of the current target candidate music to obtain a tag score corresponding to the current target candidate music. For example, the popularity of the target candidate music is higher, the closer the publishing time, and the more the playing amount, the higher the corresponding tag score that may be set. Further, the computer device performs weighted summation processing on the tag score and the first matching value of the current target candidate music to obtain a music score of the current target candidate music, so that the computer device can select matched music according to the music score respectively corresponding to each piece of target candidate music, for example, taking the target candidate music with the highest score as the matched music.

In an embodiment, the computer device may input the music tag to a preset scoring model, and obtain a tag score by means of the scoring model.

In the foregoing embodiment, since the matched music is selected from the music library by integrating the first matching value and the music tag, so that the long-time audio speed of the selected matched music can be matched with the cut speed, and the selected matched music also has high popularity. Thus, the accuracy of matching music with a video is improved, and user experience is also greatly improved.

In an embodiment, the determining, according to a video duration of said video and a high-scale point corresponding to the matched music, a short-time audio speed respectively corresponding to each music clip in the matched music includes: performing segmentation processing on matched music according the video duration of said video to obtain at least one music clip, and determining the number of high-scale points corresponding to each of music clips; and for each of the plurality of music clips, obtaining a short-time audio speed of the corresponding music clip according to the number of high-scale points corresponding to the music clip and a clip duration of the music clip.

Specifically, in order to intercept an appropriate target music clip from the matched music, the short-time audio speed respectively corresponding to each music clip in the matched music may be determined, so that the corresponding target music clip may be determined subsequently on the basis of the short-time audio speed. When the short-time audio speed needs to be determined, the computer device performs segmentation processing on the matched music to obtain at least one music clip, and counts the number of high-scale points included in each of music clips. The computer device determines a clip duration respectively corresponding to each music clip, and obtains a short-time audio speed of the corresponding music clip according to the clip duration and the number of high-scale points. For example, when the number of high-scale points corresponding to the current music clip and the clip duration of the current music clip are determined, the computer device divides the number of high-scale points corresponding to the current music clip by the clip duration of the current music clip to obtain the short-time audio speed of the current music clip.

In this embodiment, only by determining the number of high-scale points and the clip duration, the short-time audio speed can be quickly obtained on the basis of the number of high-scale points and the clip duration, thereby improving the efficiency of determining the short-time audio speed.

In an embodiment, the performing segmentation processing on the matched music according to the video duration of said video to obtain at least one music clip includes: obtaining a second sliding window, and triggering, according to a second preset sliding step length, the second sliding window to slide on an audio signal sequence corresponding to the matched music, to obtain at least one audio signal segment boxed by the second sliding window, where a segment duration of the audio signal segment boxed by the second sliding window is consistent with the video duration of said video; and taking an audio corresponding to the audio signal segment as a music clip obtained by means of segmentation processing.

Specifically, the computer device may generate a second sliding window, and in order to ensure that the clip length of the finally obtained target music clip is consistent with the video length of said video, the segment duration of the audio signal segment boxed by the second sliding window frame can be set as the video duration of said video. The segment duration of the audio signal segment refers to a span duration of the audio signal segment in the audio signal sequence.

Further, the computer device enables, according to a second preset sliding step length, the second sliding window to slide on an audio signal sequence of the matched music, to obtain a plurality of boxed audio signal segments. The sliding step length may be freely set according to requirements. For example, when the sliding step length is 20 seconds and the video duration of said video is 30 seconds, the computer device determines the audio sampling point collected at the 0th second to the audio sampling point collected at the 30th second in the audio signal sequence as the audio sampling points included in the first audio signal segment, determines the audio sampling point collected at the 20th second to the audio sampling point collected at the 50th second in the audio signal sequence as the audio sampling points included in the second audio signal segment, and so on, until a final audio signal segment is obtained. Further, the computer device integrates audios respectively corresponding to the audio sampling points in the audio signal segment to obtain a corresponding music clip.

In an embodiment, the computer device may determine, according to a preset sliding step length and a segment duration of an audio signal segment boxed by the second sliding window, a segment time point used for segmenting the matched music, and perform segmentation processing on the matched music on the basis of the segment time point to obtain at least one music clip.

In an embodiment, when the second sliding window slides on the audio signal sequence, the number of the high-scale points included in the audio signal segment currently boxed by the second sliding window can further be synchronously confirmed, so that the short-time audio speed of the audio signal segment currently boxed by the second sliding window is obtained on the basis of the number of the high-scale points and the video duration of said video, that is, the short-time audio speed of the corresponding music clip is obtained.

In the foregoing embodiment, by configuring the second sliding window, the corresponding music clip may be quickly determined on the basis of the configured second sliding window, thereby improving the efficiency of determining the music clip.

In an embodiment, the determining a target music clip in the matched music according to the cut speed and the short-time audio speed includes: matching the short-time audio speed respectively corresponding to each music clip with the cut speed to obtain a second matching value respectively corresponding to each music clip; and selecting a target music clip from the plurality of music clips according to the second matching value.

Specifically, when the short-time audio speed of each music clip in the matched music is obtained, the computer device matches the cut speed with the short-time audio speed of each music clip to obtain a second matching value between the music clip and said video. For example, the computer device may determine the corresponding second matching value according to the difference between the short-time audio speed and the cut speed. The smaller the difference, the higher the matching degree between the short-time audio speed and the cut speed, and the higher the second matching value. Further, the computer device takes the music clip having the highest second matching value as a target music clip, and synthesizes the target music clip and said video to obtain a target video.

Figure 7:
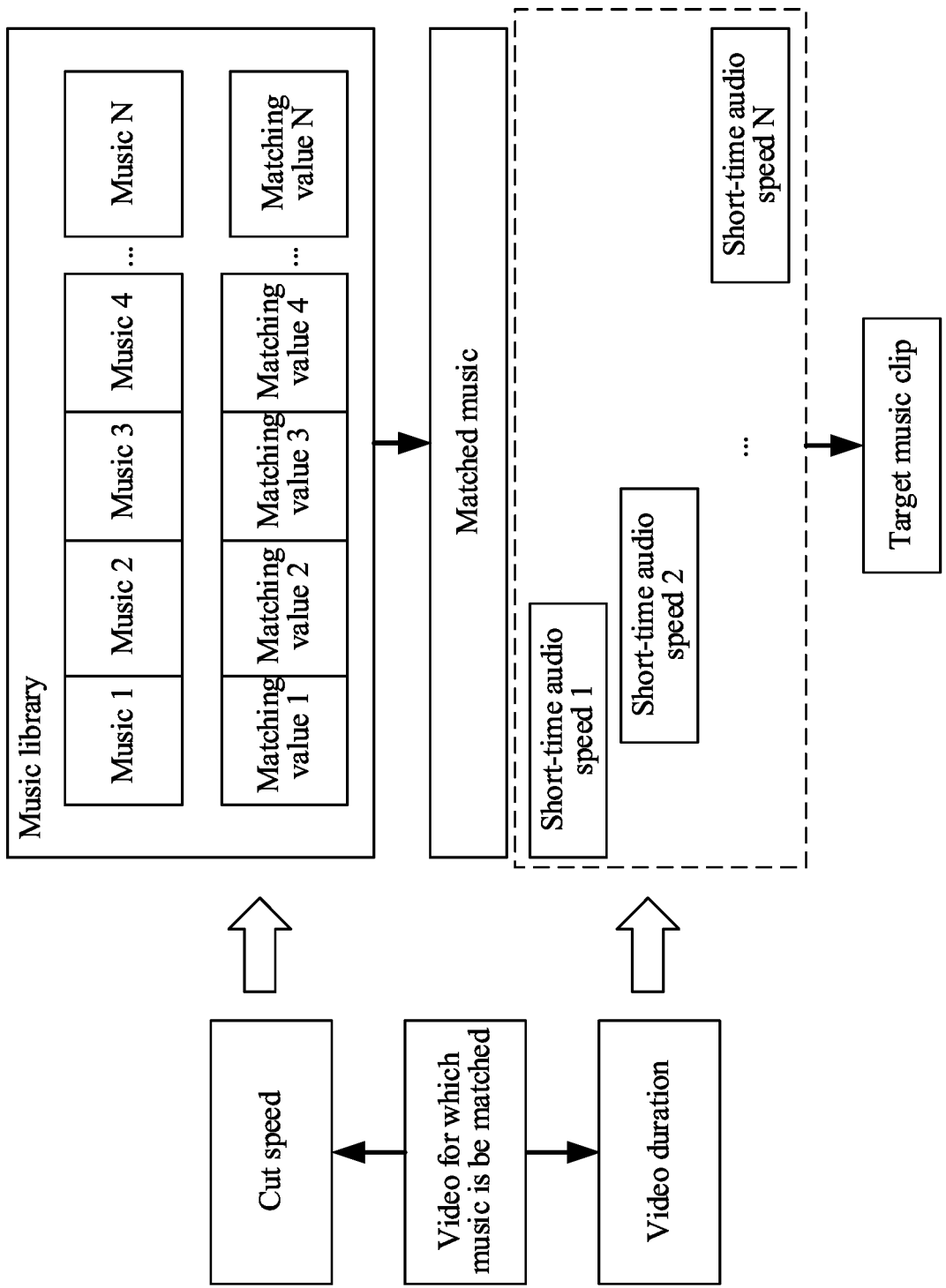
FIG. 7 is a schematic diagram of determining a target music clip according to an embodiment.

In an embodiment, FIG. 7 shows a schematic diagram of determining a target music clip according to an embodiment. when the cut speed of said video and the long-time audio speed of the candidate music are determined, the computer device may match the cut speed and the long-time audio speed to obtain a first matching value between the cut speed and each long-time audio speed, that is, a first matching value between said video and each piece of candidate music is obtained. The computer device takes the candidate music with the highest first matching value as matched music, and determines the short-time audio speed respectively corresponding to each music clip in the matched music. The computer device matches the cut speed and each short-time audio speed to obtain a second matching value between the cut speed and each short-time audio speed, that is, a second matching value between said video and each music clip is obtained, and the music clip with the highest second matching value is taken as a target music clip.

In this embodiment, by determining the second matching value, the most matched target music clip may be selected from the plurality of music clips on the basis of the second matching value, so that the matched music generated on the basis of the target music clip may better satisfy the rhythm-synchronized requirement.

This application further provides an application scene, and the application scene applies the foregoing method for matching music with a video. Specifically, the application of the method for matching music with a video in the application scene is as follows.

Figure 8:
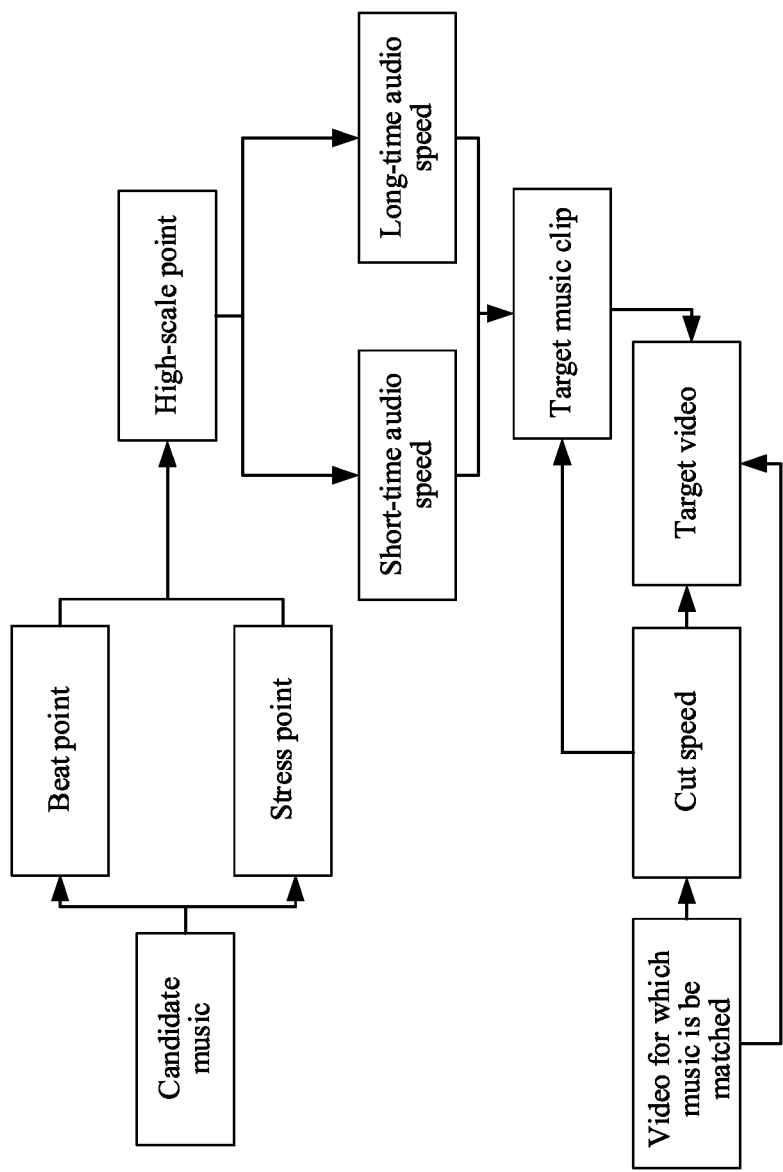
FIG. 8 is a schematic diagram of an overall architecture of matching music with a video according to an embodiment.

Referring to FIG. 8, when a user wants to match music with on an edited short video, the user may input the short video into an application for matching music with a video, and determine the cut speed of the inputted short video through the application for matching music with a video. The application for matching music with a video may be a native application or a child application in a parent application, or may be a webpage application. This is not limited in this embodiment. Further, the application for matching music with a video determines a beat point and a stress point in each piece of candidate music, and determines a corresponding high-scale point according to the determined beat point and stress point. The application for matching music with a video determines a long-time audio speed according to the high-scale point and the music duration of the candidate music, and determines matched music according to a matching degree between the long-time audio speed and the cut speed. The application for matching music with a video determines a high-scale point in each music clip in the matched music, determines a corresponding short-time audio speed, determines a target music clip according a matching degree between the short-time audio speed and the cut speed, and synthesizes the target music clip and the short video to obtain a target video. FIG. 8 is a schematic diagram of an overall architecture of matching music with a video according to an embodiment.

This application further provides an application scene, and the application scene applies the foregoing method for matching music with a video. Specifically, the application of the method for matching music with a video in the application scene is as follows.

Figure 9:
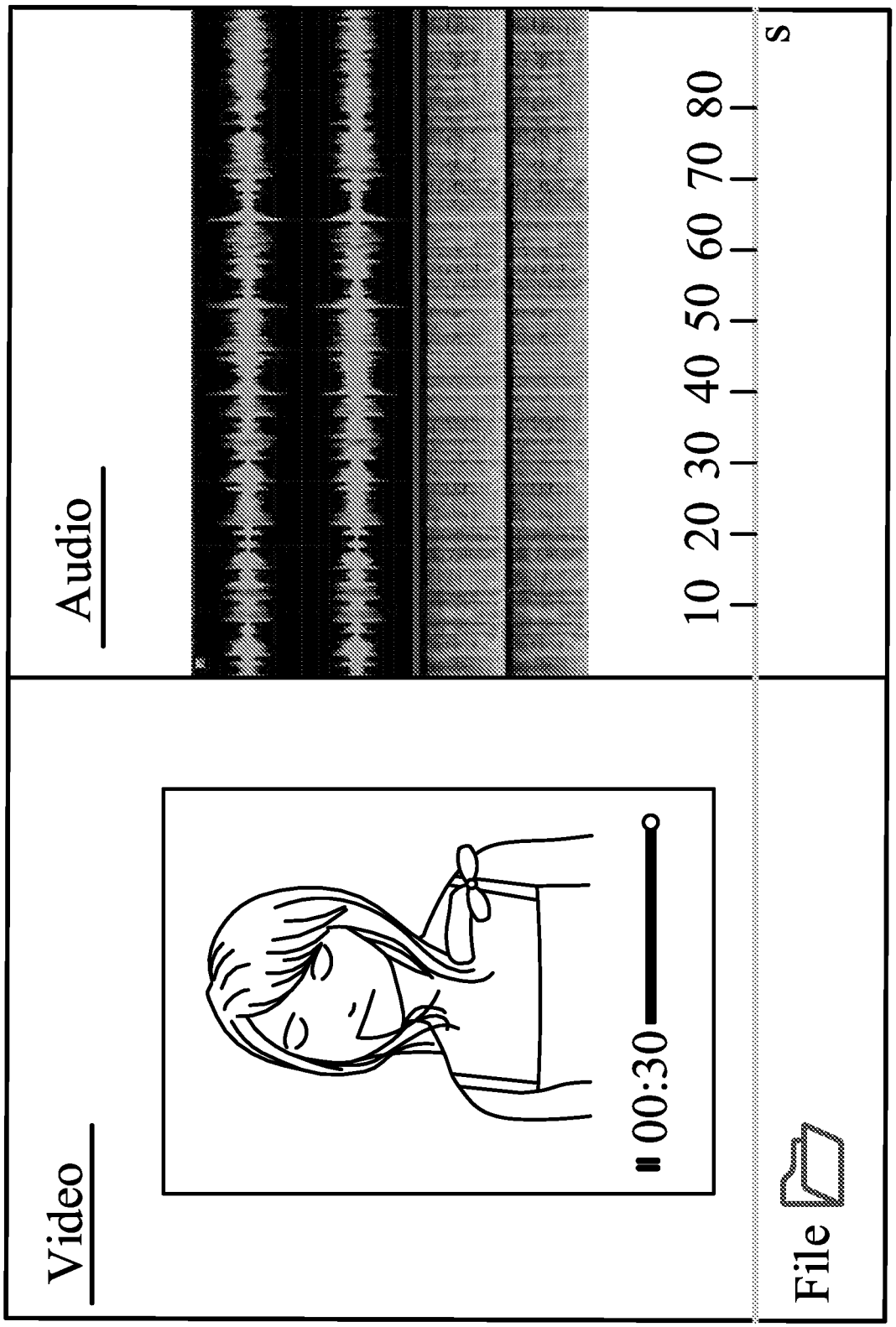
FIG. 9 is a schematic diagram of playing a target video according to an embodiment.

Referring to FIG. 9, after the user uses the application for matching music with a video to match music with the edited short video to obtain the target video, the target video may also be played through the application. The user can import the to-be-played target video through a file control, so that the application for matching music with a video can play the corresponding music while playing a video picture. FIG. 9 is a schematic diagram of playing a target video according to an embodiment.

The foregoing application scene is merely illustrative, and it can be understood that the application of the service-related data reporting method provided in the embodiments of this application is not limited to the foregoing scene.

Figure 10:
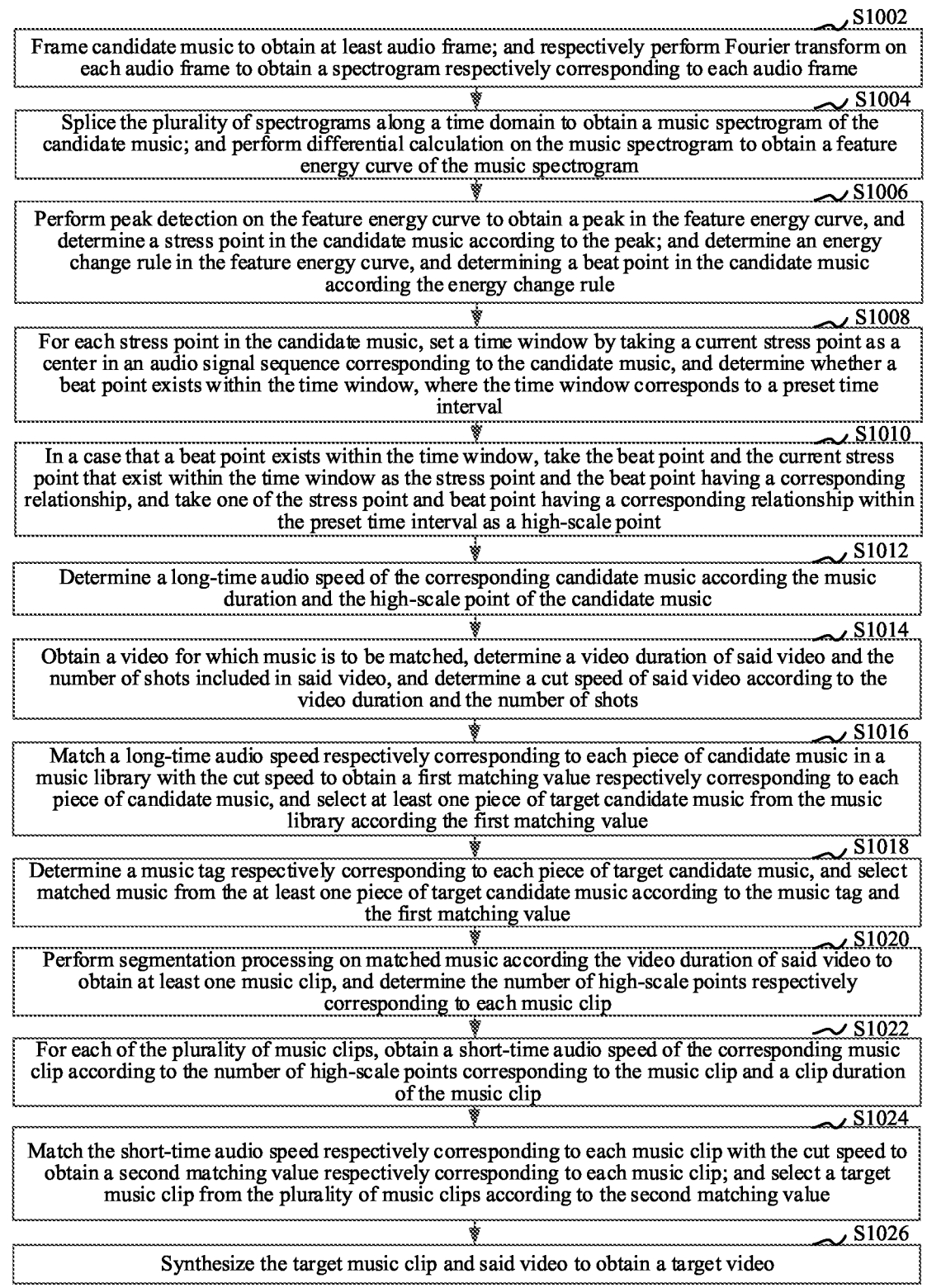
FIG. 10 is a schematic flowchart of matching music with a video according to a specific embodiment.

In a specific embodiment, referring to FIG. 10, the method for matching music with a video includes the following steps:

S1002: Frame candidate music to obtain at least one audio frame; and respectively performing Fourier transform on each audio frame to obtain a spectrogram respectively corresponding to each audio frame.

S1004: Splice the plurality of spectrograms along a time domain to obtain a music spectrogram of the candidate music; and perform differential calculation on the music spectrogram to obtain a feature energy curve of the music spectrogram.

S1006: Perform peak detection on the feature energy curve to obtain a peak in the feature energy curve, and determine a stress point in the candidate music according to the peak; and determine an energy change rule in the feature energy curve, and determine a beat point in the candidate music according the energy change rule.

S1008: For each stress point in the candidate music, set a time window by taking a current stress point as a center in an audio signal sequence corresponding to the candidate music, and determine whether a beat point exists within the time window, where the time window corresponds to a preset time interval.

S1010: When a beat point exists within the time window, take the beat point and the current stress point that exist within the time window as the stress point and the beat point having a corresponding relationship, and take one of the stress point and beat point having a corresponding relationship within the preset time interval as a high-scale point.

S1012: Determine a long-time audio speed of the corresponding candidate music according the music duration and the high-scale point of the candidate music.

S1014: Obtain a video for which music is to be matched, determine a video duration of said video and the number of shots included in said video, and determine a cut speed of said video according to the video duration and the number of shots.

S1016: Match a long-time audio speed respectively corresponding to each piece of candidate music in a music library with the cut speed to obtain a first matching value respectively corresponding to each piece of candidate music, and select at least one piece of target candidate music from the music library according the first matching value.

S1018: Determine a music tag respectively corresponding to each piece of target candidate music, and selecting matched music from the at least one piece of target candidate music according to the music tag and the first matching value.

S1020: Perform segmentation processing on the matched music according to the video duration of said video to obtain at least one music clip, and determine the number of high-scale points respectively corresponding to each music clip.

S1022: For each of the plurality of music clips, obtain a short-time audio speed of the corresponding music clip according to the number of high-scale points corresponding to the music clip and a clip duration of the music clip.

S1024: Match the short-time audio speed respectively corresponding to each music clip with the cut speed to obtain a second matching value respectively corresponding to each music clip; and select a target music clip from the plurality of music clips according to the second matching value.

S1026: Synthesize the target music clip and said video to obtain a target video.

In the method for matching music with a video, a cut speed of said video may be determined by obtaining said video. By obtaining the music library, the long-time audio speed and the high-scale point respectively corresponding to each piece of candidate music in the music library may be determined, so that matched music may be preferentially selected from the music library on the basis of the long-time audio speed and the cut speed. By determining the matched music, the short-time audio speed of each music clip in the matched music may be determined on the basis of the high-scale point and the video duration of said video, so that the most matched target music clip is selected from the plurality of music clips on the basis of the short-time audio speed and the cut speed. In this way, the target video synthesized on the basis of the most matched target music clip can be closer to the music rhythm, so that a scene transition time point in the target video is more matched with an occurrence time point of a stress or beat, thereby greatly improving the viewing experience. Music can be automatically matched with said video by the computer device, and therefore, compared with conventional manual matching, this application can also improve the matching efficiency of matching music with a video.

It is to be understood that, although the steps of the flowcharts in FIG. 2 and FIG. 10 are displayed sequentially according to arrows, the steps are not necessarily performed according to an order indicated by arrows. Unless otherwise explicitly specified in this application, execution of the steps is not strictly limited, and the steps may be performed in other sequences. Furthermore, at least some steps in FIG. 2 and FIG. 10 may include a plurality of sub-steps or a plurality of stages. The sub-steps or stages are not necessarily performed at a same time, and may be performed at different times. The sub-steps or stages are not necessarily performed in order, and may be performed in turn or alternately with other steps or at least some of sub-steps or stages of other steps.

Figure 11:
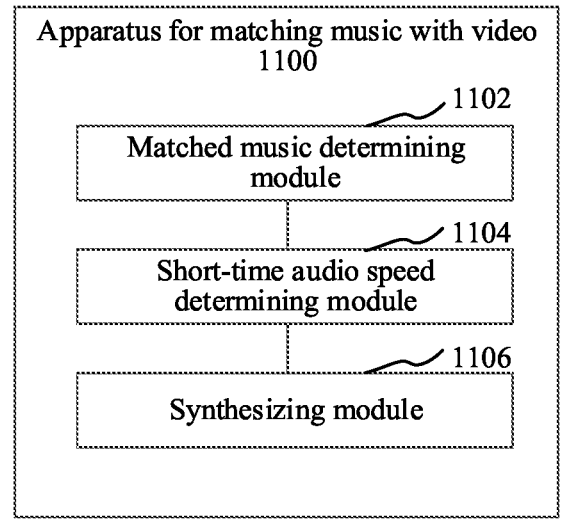
FIG. 11 is a structural block diagram of an apparatus for matching music with a video according to an embodiment.

In an embodiment, as shown in FIG. 11, provided is an apparatus for matching music with a video 1100, and the apparatus may employ a software module or a hardware module, or a combination of the two to form a part of a computer device. The apparatus specifically includes: a matched music determining module 1102, a short-time audio speed determining module 1104, and a synthesizing module 1106.

The matched music determining module 1102 is configured to: obtain a video for which music is to be matched, and determine a cut speed of said video; determine a long-time audio speed corresponding to each of a plurality of pieces of candidate music; the long-time audio speed being determined according to a high-scale point and a music duration of the candidate music, and the high-scale point being determined on the basis of a beat point and a stress point of the candidate music; and select matched music from the candidate music according to the cut speed and the long-time audio speed.

The short-time audio speed determining module 1104 is configured to determine, according to a video duration of said video and a high-scale point corresponding to the matched music, a short-time audio speed respectively corresponding to each music clip in the matched music.

The synthesizing module 1106 is configured to determine a target music clip in the matched music according to the cut speed and the short-time audio speed, and synthesize the target music clip and said video to obtain a target video.

Figure 12:
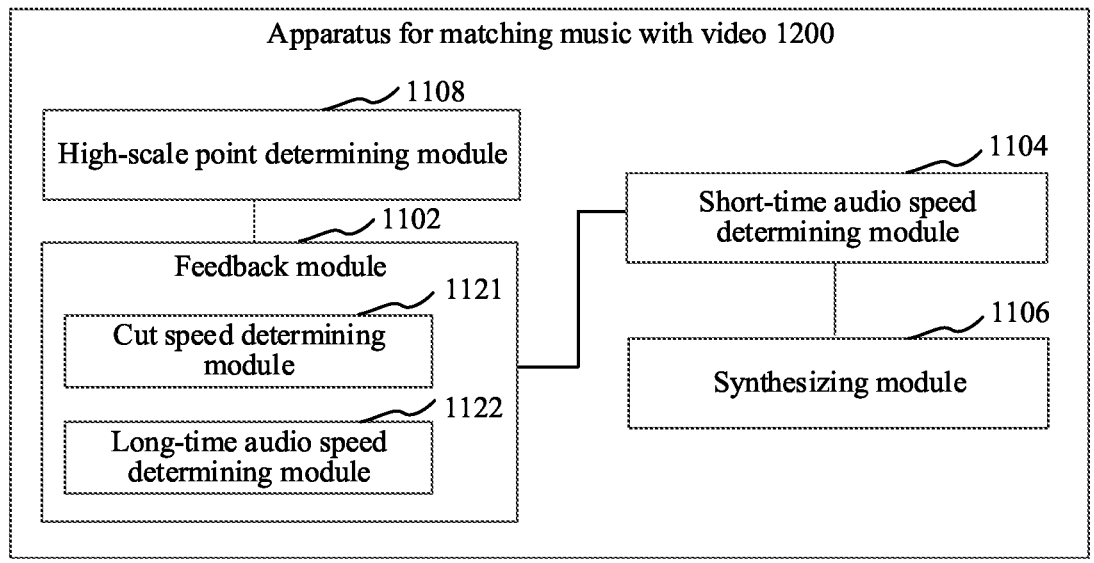
FIG. 12 is a structural block diagram of an apparatus for matching music with a video according to another embodiment.

In an embodiment, referring to FIG. 12, the matched music determining module 1102 includes a cut speed determining module 1121, which is configured to: determine a video duration of said video and the number of shots included in said video; and determine the cut speed of said video according to the video duration and the number of shots.

In an embodiment, the matched music determining module 1102 includes a long-time audio speed determining module 1122, which is configured to: for each piece of candidate music in a music library, determine a beat point and a stress point in the candidate music, and determine a high-scale point in the corresponding candidate music according to the beat point and the stress point; and determine a long-time audio speed of the corresponding candidate music according the music duration and the high-scale point of the candidate music.

In an embodiment, the apparatus for matching music with a video 1100 further includes a high-scale point determining module 1108, which is configured to: determine a feature energy curve corresponding the candidate music; performing peak detection on the feature energy curve to obtain a peak in the feature energy curve, and determining the stress point in the candidate music according to the peak; and determine an energy change rule in the feature energy curve, and determine a beat point in the candidate music according the energy change rule.

In an embodiment, the high-scale point determining module 1108 is further configured to: frame candidate music to obtain at least one audio frame; respectively perform Fourier transform on each audio frame to obtain a spectrogram respectively corresponding to each audio frame; splice the plurality of spectrograms along a time domain to obtain a music spectrogram of the candidate music; and perform differential calculation on the music spectrogram to obtain a feature energy curve of the music spectrogram.

In an embodiment, the high-scale point determining module 1108 is further configured to: obtain a first sliding window, and smooth the feature energy curve through the first sliding window to obtain an energy change rule in the feature energy curve; and obtain a beat point in the candidate music according the energy change rule.

In an embodiment, the high-scale point determining module 1108 is further configured to: trigger the first sliding window to slide on the feature energy curve according to a first preset sliding step length to obtain a plurality of feature energy curve segments boxed by the first sliding window; for the plurality of feature energy curve segments boxed by the first sliding window, determine a change rule of peaks and troughs in each feature energy curve segment; when the change rules of the peaks and troughs in two adjacent feature energy curve segments are consistent, determine that the two adjacent feature energy curve segments respectively correspond to one beat; and select, from the candidate music, a music clip corresponding to a feature energy curve segment corresponding to one beat, and take a collection time of the first audio sampling point in the music clip as a beat point.

In an embodiment, the high-scale point determining module 1108 is further configured to: for each stress point in the candidate music, set a time window by taking a current stress as a center, and determine whether a beat point exists within the time window, where the time window corresponds to the preset time interval; and when a beat point exists within the time window, take the beat point and the current stress point that exist within the time window as the stress point and beat point having a corresponding relationship.

In an embodiment, the high-scale point determining module 1108 is further configured to take one of a stress point and a beat point existing within a preset time interval in the candidate music as a high-scale point.

In an embodiment, basic points include beat points and stress points. The high-scale point determining module 1108 is further configured to: for each stress point in the candidate music, set a time window by taking a current stress point as a center, and determine whether a beat point exists within the time window, where the time window corresponds to the preset time interval; and when a beat point exists within the time window, take one of the beat point and the current stress point that exist within the time window as a high-scale point.

In an embodiment, the matched music determining module 1102 is further configured to: match the long-time audio speed respectively corresponding to each piece of candidate music in a music library with the cut speed to obtain a first matching value respectively corresponding to each piece of candidate music; select at least one piece of target candidate music from the music library according the first matching value; and determine a music tag respectively corresponding to each piece of target candidate music, and select matched music from the at least one piece of target candidate music according to the music tag and the first matching value.

In an embodiment, the matched music determining module 1102 is further configured to: obtain a music tag respectively corresponding to each piece of target candidate music; the music tag at least including one of a music popularity, a music publishing time, and a music playing amount; for each of the plurality of pieces of target candidate music, score the corresponding target candidate music according to the music tag to obtain a tag score of the corresponding target candidate music; and fuse the tag score and the first matching value respectively corresponding to the target candidate music to obtain a music score of the corresponding target candidate music, and select the matched music according to the music score respectively corresponding to each piece of target candidate music.

In an embodiment, the short-time audio speed determining module 1104 is further configured to: perform segmentation processing on matched music according the video duration of said video to obtain at least one music clip, and determine the number of high-scale points respectively corresponding to each music clip; and for each of the plurality of music clips, obtain a short-time audio speed of the corresponding music clip according to the number of high-scale points corresponding to the music clip and a clip duration of the music clip.

In an embodiment, the short-time audio speed determining module 1104 is further configured to: obtain a second sliding window, and trigger, according to a second preset sliding step length, the second sliding window to slide on an audio signal sequence corresponding to the matched music, to obtain at least one audio signal segment boxed by the second sliding window, where a segment duration of the audio signal segment boxed by the second sliding window is consistent with the video duration of said video; and take an audio corresponding to the audio signal segment as a music clip obtained by means of segmentation processing.

In an embodiment, the synthesizing module 1106 is further configured to: match the short-time audio speed respectively corresponding to each music clip with the cut speed to obtain a second matching value respectively corresponding to each music clip; and select a target music clip from the plurality of music clips according to the second matching value.

For the specific definition of the apparatus for matching music with a video, reference may be made to the definition of the method for matching music with a video in the foregoing text, and details are not described herein again. Each module of the apparatus for matching music with a video may be implemented entirely or partially through software, hardware, or a combination thereof. The foregoing modules may be embedded in or independent of a processor in a computer device in a hardware form, or may be stored in a memory in a computer device in the form of software, so that the processor invokes an operation corresponding to each of the foregoing modules.

Figure 13:
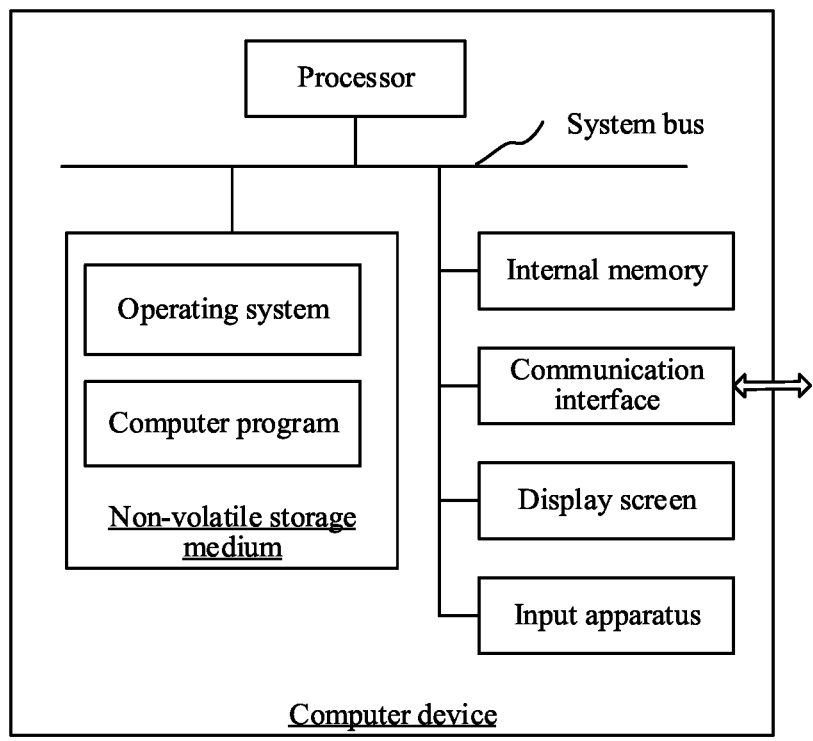
FIG. 13 is a diagram of an internal structure of a computer device according to an embodiment.

In an embodiment, provided is a computer device. The computer device may be a terminal, and an internal structure diagram thereof may be as shown in FIG. 13. The computer device includes a processor, a memory, a communication interface, a display screen, and an input apparatus that are connected by means of a system bus. The processor of the computer device is configured to provide computation and control ability. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or wireless manner, and the wireless manner may be implemented by WiFi, an operator network, near field communication (NFC), or other technologies. The computer program is executed by a processor to implement the method for matching music with a video. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

A person skilled in the art may understand that, the structure shown in FIG. 13 is merely a block diagram of a partial structure related to a solution in this application, and does not constitute a limitation to the computer device to which the solution in this application is applied. Specifically, the computer device may include more components or fewer components than those shown in the figure, or some components may be combined, or a different component deployment may be used.

In an embodiment, further provided is a computer device, including a memory and a processor, the memory storing a computer program, and the processor, when executing the computer program, implementing the steps of the foregoing method embodiments.

In an embodiment, provided is a computer-readable storage medium, having a computer program stored thereon, the computer program, when executed by a processor, implementing the steps of the foregoing method embodiments.

In an embodiment, provided is a computer program product or a computer program, the computer program product or computer program including computer instructions, and the computer instructions being stored in the computer-readable storage medium. A processor of the computer device reads the computer instructions from the computer-readable storage medium, and the processor executes the computer instructions to cause the computer device to implement the steps of the foregoing method embodiments.

A person skilled in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. References to the memory, the storage, the database, or other medium used in the embodiments provided in this application may all include at least one of a non-volatile and a volatile memory. The non-volatile memory may include a read-only memory (ROM), a magnetic tape, a floppy disk, a flash memory, or an optical memory. The volatile memory may be a random access memory (RAM) or an external cache memory. By way of illustration, and not limitation, the RAM may be in various forms, such as a static random access memory (SRAM) or a dynamic random access memory (DRAM), etc.

Technical features of the foregoing embodiments may be randomly combined. To make description concise, not all possible combinations of the technical features in the foregoing embodiments are described. However, the combinations of these technical features shall be considered as falling within the scope recorded by this description provided that no conflict exists.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing embodiments only describe several implementations of this application, which are described specifically and in detail, but cannot be construed as a limitation to the patent scope of this application. For a person skilled in the art, several transformations and improvements can be made without departing from the idea of this application. These transformations and improvements belong to the protection scope of this application. Therefore, the protection scope of the patent of this application shall be subject to the appended claims.

What is claimed is:

1. A method for matching music with a video performed by a computer device, the method comprising:
   determining a cut speed of a video for which music is to be matched;
   determining a long-time audio speed corresponding to each of a plurality of pieces of candidate music according to a high-scale point and a music duration of the candidate music;

selecting matched music from the plurality of pieces of candidate music according to the cut speed of the video and the corresponding long-time audio speeds;

determining, according to a video duration of the video and a high-scale point corresponding to the matched music, a short-time audio speed respectively corresponding to each music clip in the matched music; and determining a target music clip in the matched music according to the cut speed of the video and the corresponding short-time audio speed, and synthesizing the target music clip and the video to obtain a target video.

2. The method according to claim 1, wherein the determining a cut speed of a video comprises:

determining a video duration of the video and a number of shots comprised in the video; and determining the cut speed of the video according to the video duration and the number of shots.

3. The method according to claim 1, wherein the long-time audio speed reflects a frequency at which the high-scale point appears in the candidate music; and the short-time audio speed reflects a frequency at which the high-scale point appears in each music clip.

4. The method according to claim 1, wherein the determining a long-time audio speed corresponding to each of a plurality of pieces of candidate music comprises:

for each piece of candidate music in a music library, determining a beat point and a stress point in the candidate music, and determining a high-scale point in the corresponding candidate music according to the beat point and the stress point; and determining a long-time audio speed of the corresponding candidate music according to the music duration and the high-scale point of the candidate music.

5. The method according to claim 1, wherein the selecting matched music from the plurality of pieces of candidate music according to the cut speed of the video and the corresponding long-time audio speeds comprises:

matching a long-time audio speed respectively corresponding to each piece of candidate music in a music library with the cut speed to obtain a first matching value respectively corresponding to the candidate music;

selecting at least one piece of target candidate music from the music library according to the first matching value; and determining a music tag respectively corresponding to each piece of target candidate music, and selecting the matched music from the at least one target candidate music according to the music tag and the first matching value.

6. The method according to claim 1, wherein the determining, according to a video duration of the video and a high-scale point corresponding to the matched music, a short-time audio speed respectively corresponding to each music clip in the matched music comprises:

performing segmentation processing on the matched music according to the video duration of said video to obtain at least one music clip, and determining the number of high-scale points corresponding to each of the music clips; and for each of the plurality of music clips, obtaining a short-time audio speed of the corresponding music clip according to the number of high-scale points corresponding to the music clip and a clip duration of the music clip.

7. The method according to claim 1, wherein the determining a target music clip in the matched music according to the cut speed of the video and the corresponding short-time audio speed comprises:

matching the short-time audio speed respectively corresponding to each music clip with the cut speed to obtain a second matching value respectively corresponding to each music clip; and selecting a target music clip from the plurality of music clips according to the second matching value.

8. A computer device, comprising a memory and one or more processors, the memory storing computer-readable instructions, and the computer-readable instructions, when executed by the processor, causing the computer device to perform a method for matching music with a video including:

determining a cut speed of a video for which music is to be matched;

determining a long-time audio speed corresponding to each of a plurality of pieces of candidate music according to a high-scale point and a music duration of the candidate music;

selecting matched music from the plurality of pieces of candidate music according to the cut speed of the video and the corresponding long-time audio speeds;

determining, according to a video duration of the video and a high-scale point corresponding to the matched music, a short-time audio speed respectively corresponding to each music clip in the matched music; and determining a target music clip in the matched music according to the cut speed of the video and the corresponding short-time audio speed, and synthesizing the target music clip and the video to obtain a target video.

9. The computer device according to claim 8, wherein the determining a cut speed of a video comprises:

determining a video duration of the video and a number of shots comprised in the video; and determining the cut speed of the video according to the video duration and the number of shots.

10. The computer device according to claim 8, wherein the long-time audio speed reflects a frequency at which the high-scale point appears in the candidate music; and the short-time audio speed reflects a frequency at which the high-scale point appears in each music clip.

11. The computer device according to claim 8, wherein the determining a long-time audio speed corresponding to each of a plurality of pieces of candidate music comprises:

for each piece of candidate music in a music library, determining a beat point and a stress point in the candidate music, and determining a high-scale point in the corresponding candidate music according to the beat point and the stress point; and determining a long-time audio speed of the corresponding candidate music according to the music duration and the high-scale point of the candidate music.

12. The computer device according to claim 8, wherein the selecting matched music from the plurality of pieces of candidate music according to the cut speed of the video and the corresponding long-time audio speeds comprises:

matching a long-time audio speed respectively corresponding to each piece of candidate music in a music library with the cut speed to obtain a first matching value respectively corresponding to the candidate music;

selecting at least one piece of target candidate music from the music library according to the first matching value; and determining a music tag respectively corresponding to each piece of target candidate music, and selecting the matched music from the at least one target candidate music according to the music tag and the first matching value.

13. The computer device according to claim 8, wherein the determining, according to a video duration of the video and a high-scale point corresponding to the matched music, a short-time audio speed respectively corresponding to each music clip in the matched music comprises:
  performing segmentation processing on the matched music according to the video duration of said video to obtain at least one music clip, and determining the number of high-scale points corresponding to each of the music clips; and
  for each of the plurality of music clips, obtaining a short-time audio speed of the corresponding music clip according to the number of high-scale points corresponding to the music clip and a clip duration of the music clip.

14. The computer device according to claim 8, wherein the determining a target music clip in the matched music according to the cut speed of the video and the corresponding short-time audio speed comprises:
  matching the short-time audio speed respectively corresponding to each music clip with the cut speed to obtain a second matching value respectively corresponding to each music clip; and
  selecting a target music clip from the plurality of music clips according to the second matching value.

15. A non-transitory computer-readable storage medium, storing a computer program, the computer program, when executed by one or more processors of a computer device, causing the computer device to perform a method for matching music with a video including:
  determining a cut speed of a video for which music is to be matched;
  determining a long-time audio speed corresponding to each of a plurality of pieces of candidate music according to a high-scale point and a music duration of the candidate music;
  selecting matched music from the plurality of pieces of candidate music according to the cut speed of the video and the corresponding long-time audio speeds;
  determining, according to a video duration of the video and a high-scale point corresponding to the matched music, a short-time audio speed respectively corresponding to each music clip in the matched music; and
  determining a target music clip in the matched music according to the cut speed of the video and the corresponding short-time audio speed, and synthesizing the target music clip and the video to obtain a target video.

16. The non-transitory computer-readable storage medium according to claim 15, wherein the determining a cut speed of a video comprises:
  determining a video duration of the video and a number of shots comprised in the video; and
  determining the cut speed of the video according to the video duration and the number of shots.

17. The non-transitory computer-readable storage medium according to claim 15, wherein the determining a long-time audio speed corresponding to each of a plurality of pieces of candidate music comprises:
  for each piece of candidate music in a music library, determining a beat point and a stress point in the candidate music, and determining a high-scale point in the corresponding candidate music according to the beat point and the stress point; and
  determining a long-time audio speed of the corresponding candidate music according to the music duration and the high-scale point of the candidate music.

18. The non-transitory computer-readable storage medium according to claim 15, wherein the selecting matched music from the plurality of pieces of candidate music according to the cut speed of the video and the corresponding long-time audio speeds comprises:
  matching a long-time audio speed respectively corresponding to each piece of candidate music in a music library with the cut speed to obtain a first matching value respectively corresponding to the candidate music;
  selecting at least one piece of target candidate music from the music library according to the first matching value; and
  determining a music tag respectively corresponding to each piece of target candidate music, and selecting the matched music from the at least one target candidate music according to the music tag and the first matching value.

19. The non-transitory computer-readable storage medium according to claim 15, wherein the determining, according to a video duration of the video and a high-scale point corresponding to the matched music, a short-time audio speed respectively corresponding to each music clip in the matched music comprises:
  performing segmentation processing on the matched music according to the video duration of said video to obtain at least one music clip, and determining the number of high-scale points corresponding to each of the music clips; and
  for each of the plurality of music clips, obtaining a short-time audio speed of the corresponding music clip according to the number of high-scale points corresponding to the music clip and a clip duration of the music clip.

20. The non-transitory computer-readable storage medium according to claim 15, wherein the determining a target music clip in the matched music according to the cut speed of the video and the corresponding short-time audio speed comprises:
  matching the short-time audio speed respectively corresponding to each music clip with the cut speed to obtain a second matching value respectively corresponding to each music clip; and
  selecting a target music clip from the plurality of music clips according to the second matching value.

* * * * *